United States Patent
Ogawa et al.

(10) Patent No.: US 7,871,730 B2
(45) Date of Patent: Jan. 18, 2011

(54) FUEL CELL AND FUEL CELL STACK HAVING A FILTER MECHANISM

(75) Inventors: Tetsuya Ogawa, Wako (JP); Hiroki Homma, Asaka (JP)

(73) Assignee: Honda Motor Co., Ltd., Tokyo (JP)

(*) Notice: Subject to any disclaimer, the term of this patent is extended or adjusted under 35 U.S.C. 154(b) by 1188 days.

(21) Appl. No.: 11/471,833

(22) Filed: Jun. 21, 2006

(65) Prior Publication Data
US 2006/0292432 A1    Dec. 28, 2006

(30) Foreign Application Priority Data
Jun. 24, 2005    (JP) .............................. 2005-185379

(51) Int. Cl.
*H01M 8/10* (2006.01)
*H01M 8/02* (2006.01)
(52) U.S. Cl. .................... 429/412; 429/490; 429/465
(58) Field of Classification Search .................. None
See application file for complete search history.

(56) References Cited

U.S. PATENT DOCUMENTS

| 6,309,769 | B1 | 10/2001 | Haug |
| 6,592,743 | B2 | 7/2003 | Matsukawa et al. |
| 6,841,286 | B2 | 1/2005 | Ozeki et al. |
| 7,399,391 | B2 | 7/2008 | Oldani et al. |
| 2002/0071977 | A1 | 6/2002 | Lakshmanan et al. |
| 2002/0136936 | A1* | 9/2002 | Grieve et al. .................. 429/17 |
| 2004/0028986 | A1* | 2/2004 | Tsunoda ...................... 429/38 |
| 2004/0072059 | A1 | 4/2004 | Yamada et al. |
| 2004/0253519 | A1* | 12/2004 | Oldani et al. ............... 429/238 |
| 2005/0136316 | A1* | 6/2005 | Tsunoda et al. ............... 429/37 |

FOREIGN PATENT DOCUMENTS

| DE | 19927849 A1 | 12/1999 |
| EP | 1231663 A1 | 8/2002 |
| JP | 1-173576 | 7/1989 |
| JP | 6-10649 | 1/1994 |
| JP | 07-057761 | 3/1995 |

(Continued)

OTHER PUBLICATIONS

International Search Report for Application No. PCT/JP2006/312934, dated Oct. 6, 2006.

(Continued)

*Primary Examiner*—Dah-Wei D Yuan
*Assistant Examiner*—Maria J Laios
(74) *Attorney, Agent, or Firm*—Nelson Mullins Riley & Scarborough LLP; Anthony A. Laurentano

(57) ABSTRACT

A fuel gas supply channel connecting a fuel gas supply passage and a fuel gas inlet are provided in a separator, a channel lid member, and a circular disk member. A filter mechanism for filtering a fuel gas supplied from the fuel gas supply passage to a channel unit is provided in the fuel gas supply channel. The filter mechanism has a plurality of holes, and the cross sectional area of the opening of the hole is smaller than the cross sectional area of the opening of the fuel gas inlet.

26 Claims, 23 Drawing Sheets

FOREIGN PATENT DOCUMENTS

| | | |
|---|---|---|
| JP | 07-094200 | 4/1995 |
| JP | 2002-15752 | 1/2002 |
| JP | 2002-203579 | 7/2002 |
| JP | 2002-298874 | 10/2002 |
| JP | 2003-151589 | 5/2003 |
| JP | 2003-157876 | 5/2003 |
| JP | 2003-317757 | 11/2003 |
| JP | 2004-39254 | 2/2004 |
| JP | 2004-134181 | 4/2004 |
| JP | 2005-512278 | 4/2005 |
| WO | WO-2005/071785 A1 | 8/2005 |

OTHER PUBLICATIONS

Japanese Office Action for Application No. 2005-185379, dated Nov. 17, 2009.

* cited by examiner

FUEL CELL AND FUEL CELL STACK HAVING A FILTER MECHANISM

BACKGROUND OF THE INVENTION

1. Field of the Invention

The present invention relates to a fuel cell formed by stacking an electrolyte electrode assembly and a pair of separators. The electrolyte electrode assembly includes an anode, a cathode, and an electrolyte interposed between the anode and the cathode. Further, the present invention relates to a fuel cell stack formed by stacking a plurality of the fuel cells.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell of this type, it is necessary to remove impurities such as dust from a fuel gas and an oxygen-containing gas as reactant gases. In this regard, for example, a fuel cell system as disclosed in Japanese Laid-Open Patent Publication No. 2003-317757 is known. As shown in FIG. 23, the fuel cell system includes a fuel cell 1. The fuel cell 1 includes an anode 1b, a cathode 1c, and an electrolyte membrane 1a interposed between the anode 1b and the cathode 1c.

A reformer 2, a carbon monoxide remover 3, and an electric dust collector 4a are provided on the anode side of the fuel cell 1. The reformer 2 produces a hydrogen rich gas from a raw material gas. The carbon monoxide remover 3 removes carbon monoxide from the hydrogen rich gas. The electric dust collector 4a removes impurity particles from the hydrogen rich gas. Further, a fan 5 and an electric dust collector 4b are provided on the cathode side of the fuel cell 1. The fan 5 supplies the air as the oxygen-containing gas to the cathode 1c, and the electric dust collector 4b removes impurity particles from the air.

However, in the conventional technique, the electric dust collectors 4a, 4b are provided separately from the fuel cell 1, and spaces for providing the electric dust collectors 4a, 4b are required. Therefore, the overall size of the fuel cell system is considerably large. Further, since the electric dust collectors 4a, 4b are provided outside the fuel cell 1, it is not possible to remove dust or the like produced in the fuel cell 1.

SUMMARY OF THE INVENTION

A main object of the present invention is to provide a fuel cell and a fuel cell stack having compact structure in which after impurities are removed from a fuel gas reliably, the fuel gas is supplied to an electrolyte electrode assembly, and the desired power generation performance is achieved.

The present invention relates to a fuel cell including an electrolyte electrode assembly and a pair of separators sandwiching the electrolyte electrode assembly. The electrolyte electrode assembly includes an anode, a cathode, and an electrolyte interposed between the anode and the cathode. Each of the separators comprises a single plate.

The fuel cell comprises a fuel gas channel provided on one surface of the separator for supplying a fuel gas along an electrode surface of the anode, an oxygen-containing gas channel provided on the other surface of the separator for supplying an oxygen-containing gas along an electrode surface of the cathode, and a fuel gas supply channel provided on the one surface or on the other surface of the separator, and connected to a fuel gas supply unit and a fuel gas inlet for supplying the fuel gas into the fuel gas channel. The fuel gas supply channel includes a filter mechanism for filtering the fuel gas supplied from the fuel gas supply unit.

Preferably, the filter mechanism includes a hole for allowing the fuel gas to flow through the hole, and the cross sectional area of the opening of the hole is smaller than the cross sectional area of the opening of the fuel gas inlet.

In the structure, large impurities that would close the fuel gas inlet are collected by the filter mechanism. Therefore, the fuel gas inlet is not closed, and the fuel gas is supplied reliably and smoothly to the electrode surface of the anode from the fuel gas inlet.

Preferably, the fuel gas supply channel includes a groove formed on the one surface or on the other surface of the separator, and the fuel cell further comprises a channel lid member on the one surface or on the other surface of the separator to cover the groove, and the hole is formed in the channel lid member. Further, the fuel cell comprises a plate member provided at the channel lid member to cover the hole, and having a channel unit connecting the fuel gas supply unit and the hole. Accordingly, the structure is simplified advantageously.

Further, preferably, protrusions forming the fuel gas channel are provided on one surface of the separator, and a deformable elastic channel unit forming the oxygen-containing gas channel and tightly contacting the cathode is provided on the other surface of the separator. Since the elastic channel unit is deformed elastically, the elastic channel unit tightly contacts the cathode. In the structure, the dimensional errors or distortions that occur at the time of production in the electrolyte electrode assembly or the separator can suitably be absorbed. The damage at the time of stacking the components of the fuel cell is also prevented. Since the elastic channel member and the cathode contact at many points, improvement in the performance of collecting electricity is achieved.

Further, preferably, the fuel cell further comprises an exhaust gas channel for discharging the fuel gas and the oxygen-containing gas consumed in the reaction in the electrolyte electrode assembly as an exhaust gas in the stacking direction of the electrolyte electrode assembly and the separators, the fuel gas supply unit for supplying the fuel gas before consumption in the stacking direction is provided hermetically inside the exhaust gas channel, and the fuel gas supply channel connects the fuel gas channel and the fuel gas supply unit, and is provided along the separator surface to intersect the exhaust gas channel extending in the stacking direction. In the structure, the fuel gas before consumption is heated beforehand by the heat of the exhaust gas. Thus, improvement in the heat efficiency is achieved.

Further, preferably, the exhaust gas channel is provided at the central region of the separators. In the structure, the separators can be heated radially from the center, and improvement in the heat efficiency is achieved.

Further, preferably, the fuel gas supply unit is provided hermetically at the center of the exhaust gas channel. The fuel gas is not consumed unnecessarily, while preventing the fuel gas and the exhaust gas from being mixed together. Thus, improvement in the heat efficiency is achieved.

Further, preferably, the fuel gas inlet is provided at the center of the electrolyte electrode assembly or at an upstream position deviated from the center of the electrolyte electrode assembly in the flow direction of the oxygen-containing gas. In the structure, the fuel gas supplied into the fuel gas inlet can be distributed radially from the center of the anode. Thus, the reaction occurs uniformly, and improvement in the fuel utilization ratio is achieved.

Further, preferably, the fuel cell further comprises an oxygen-containing gas supply unit for supplying the oxygen-containing gas before consumption to the oxygen-containing gas supply channel from the outer circumference of the electrolyte electrode assembly. In the structure, the exhaust gas is discharged smoothly toward the center of the separators.

Further, preferably, the fuel cell further comprises an exhaust gas channel for discharging the fuel gas and the oxygen-containing gas consumed in the reaction in the electrolyte electrode assembly as an exhaust gas in the stacking direction of the electrolyte electrode assembly and the separators, and an oxygen-containing gas supply unit for allowing the oxygen-containing gas before consumption to flow in the stacking direction to supply the oxygen-containing gas to the oxygen-containing gas channel. The fuel gas supply unit for supplying the fuel gas before consumption in the stacking direction is provided hermetically inside the oxygen-containing gas supply unit, and the fuel gas supply channel connects the fuel gas channel and the fuel gas supply unit, and is provided along the separator surface to intersect the oxygen-containing gas supply unit extending in the stacking direction. In the structure, the fuel gas before consumption can be heated by the oxygen-containing gas, and improvement in the heat efficiency is achieved.

Further, preferably, the exhaust gas channel is provided around the separators. In the structure, the exhaust gas is used as a heat insulating layer. Therefore, heat radiation from the separator members can be prevented, and improvement in the heat efficiency is achieved.

Further, preferably, the fuel gas supply unit is provided hermetically at the central region of the separators. In the structure, the fuel gas is not consumed unnecessarily, and improvement in the heat efficiency is achieved.

Further, preferably, the electrolyte electrode assembly comprises a plurality of electrolyte electrode assemblies, and the fuel cell further comprises an oxygen-containing gas supply unit for supplying the oxygen-containing gas before consumption to the oxygen-containing gas supply channel from the inner circumference of the electrolyte electrode assemblies arranged along a virtual circle. In the structure, the fuel gas before consumption is heated by the oxygen-containing gas, and improvement in the heat efficiency is achieved.

Further, preferably, an area where the elastic channel unit is provided is smaller than a power generation area of the anode. In the structure, even if the exhaust gas flows around to the anode of the electrolyte electrode assembly, the power generation area is not present in the outer circumferential edge of the cathode opposite to the outer circumferential edge of the anode. Thus, the loss in the collected electrical current is avoided, and the performance of collecting electricity is improved advantageously.

Further, preferably, the elastic channel unit is made of an electrically conductive metal mesh member. Thus, the structure is simplified economically.

Further, preferably, the protrusions are solid portions formed on one surface of the separator by etching. In the structure, the protrusions having the desired shape can be formed at the desired positions easily. Further, the protrusions are not deformed. Thus, the load is transmitted effectively, and improvement in the performance of collecting electricity is achieved.

Further, preferably, a plurality of electrolyte electrode assemblies are arranged along a virtual circle concentric with the center of the separators. Thus, the fuel cell has compact structure, and the influence of heat distortion can be avoided.

In the present invention, the fuel gas supply channel is formed in the separator, and the fuel gas supply channel has the filter mechanism for filtering the fuel gas supplied from the fuel gas supply unit. In the structure, since the filter mechanism is provided in the fuel cell, the overall size of the fuel cells is small. The fuel gas is supplied to the electrolyte electrode assembly after the impurities produced in the reformer and the fuel cell are removed reliably. Thus, with the economical and compact structure, the desired power generation performance is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
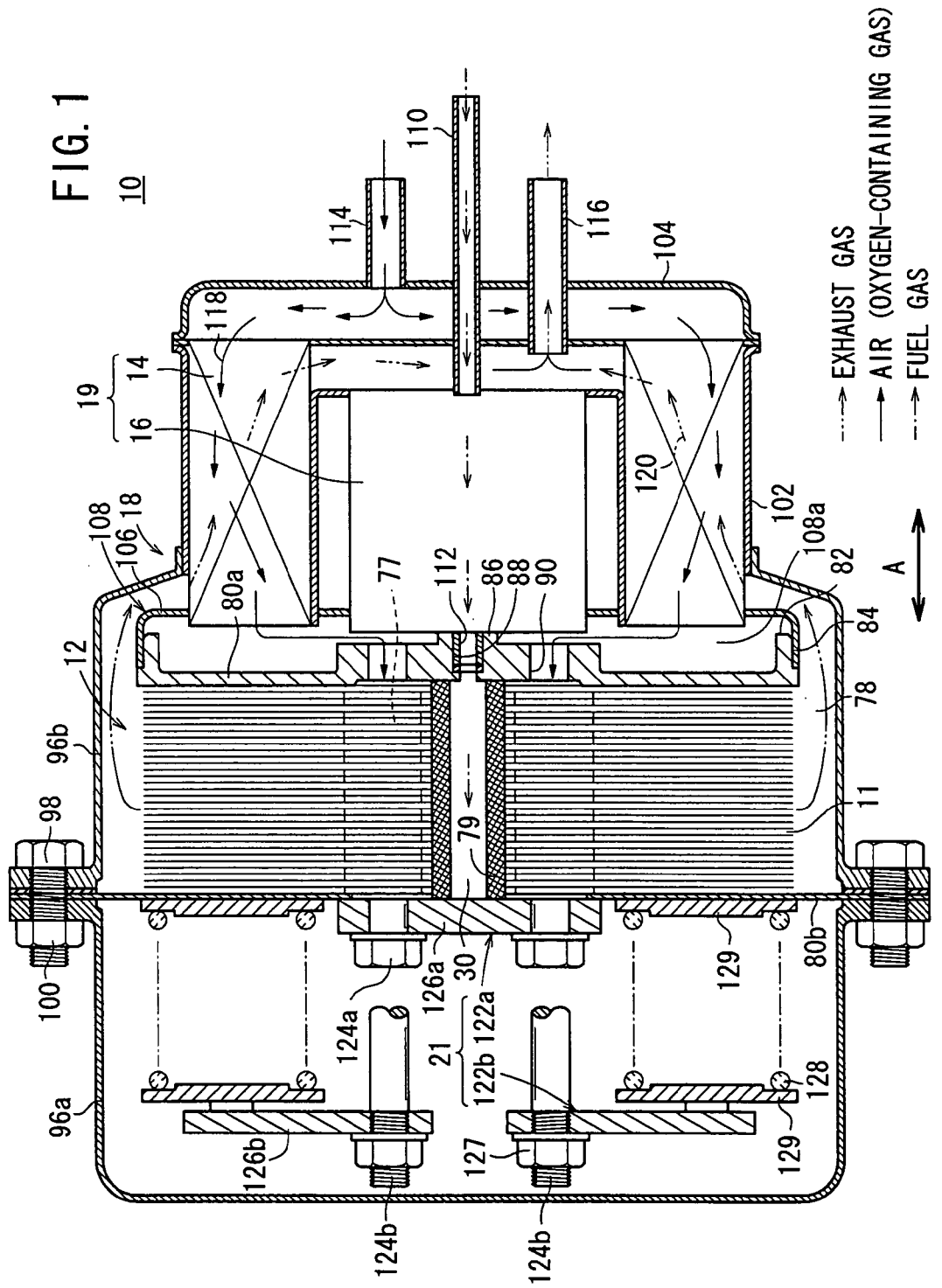
FIG. 1 is a partial cross sectional view showing a fuel cell system according to a first embodiment of the present invention.

A fuel cell system 10 is used in various applications, including stationary and mobile applications. For example, the fuel cell system 10 is mounted on a vehicle. As shown in FIG. 1, the fuel cell system 10 includes a fuel cell stack 12, a heat exchanger 14, a reformer 16, and a casing 18. The fuel cell stack 12 is formed by stacking a plurality of fuel cells 11 in a direction indicated by an arrow A. The heat exchanger 14 heats an oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
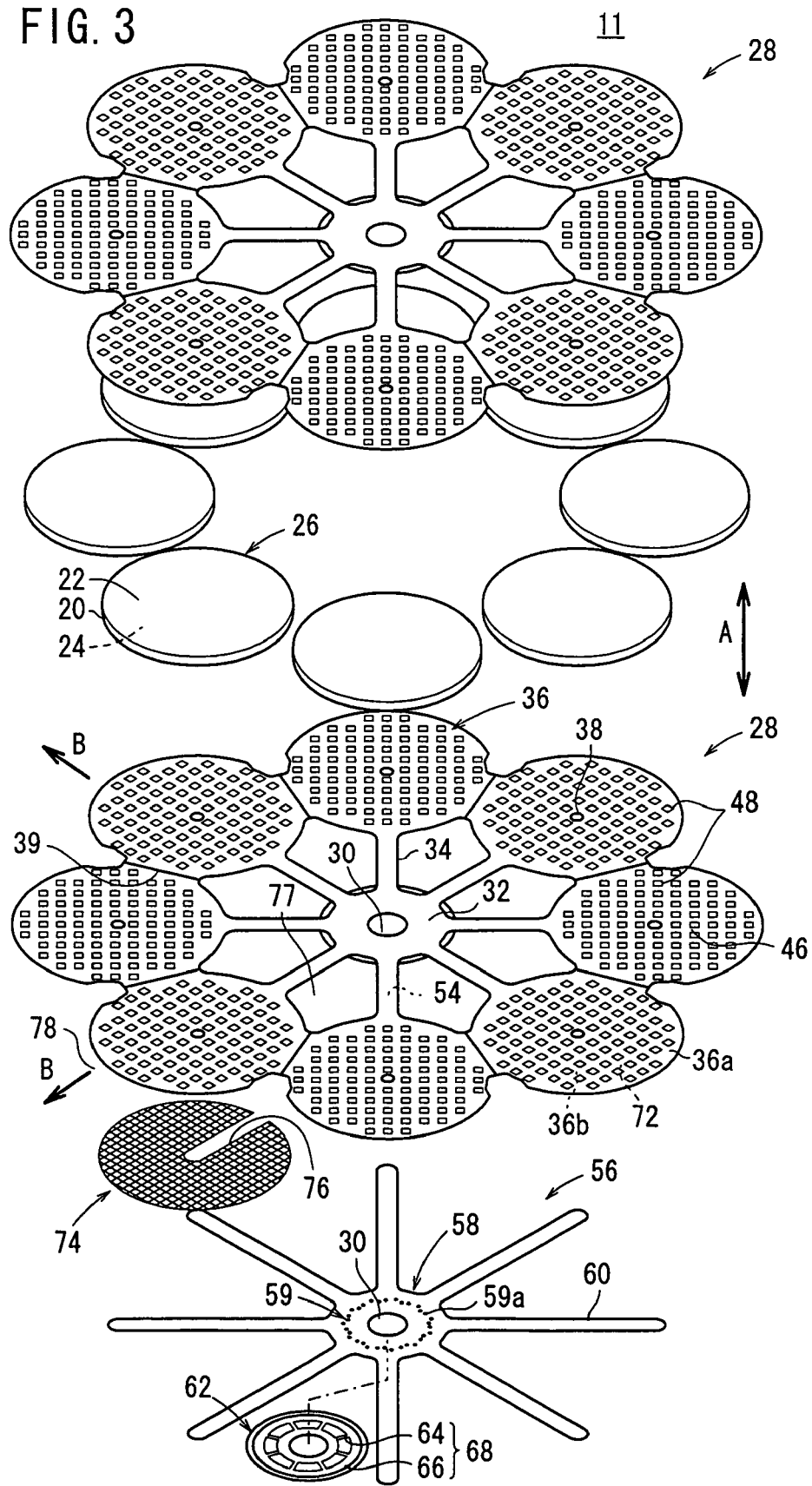
FIG. 3 is an exploded perspective view schematically showing a fuel cell of the fuel cell stack.
Figure 4:
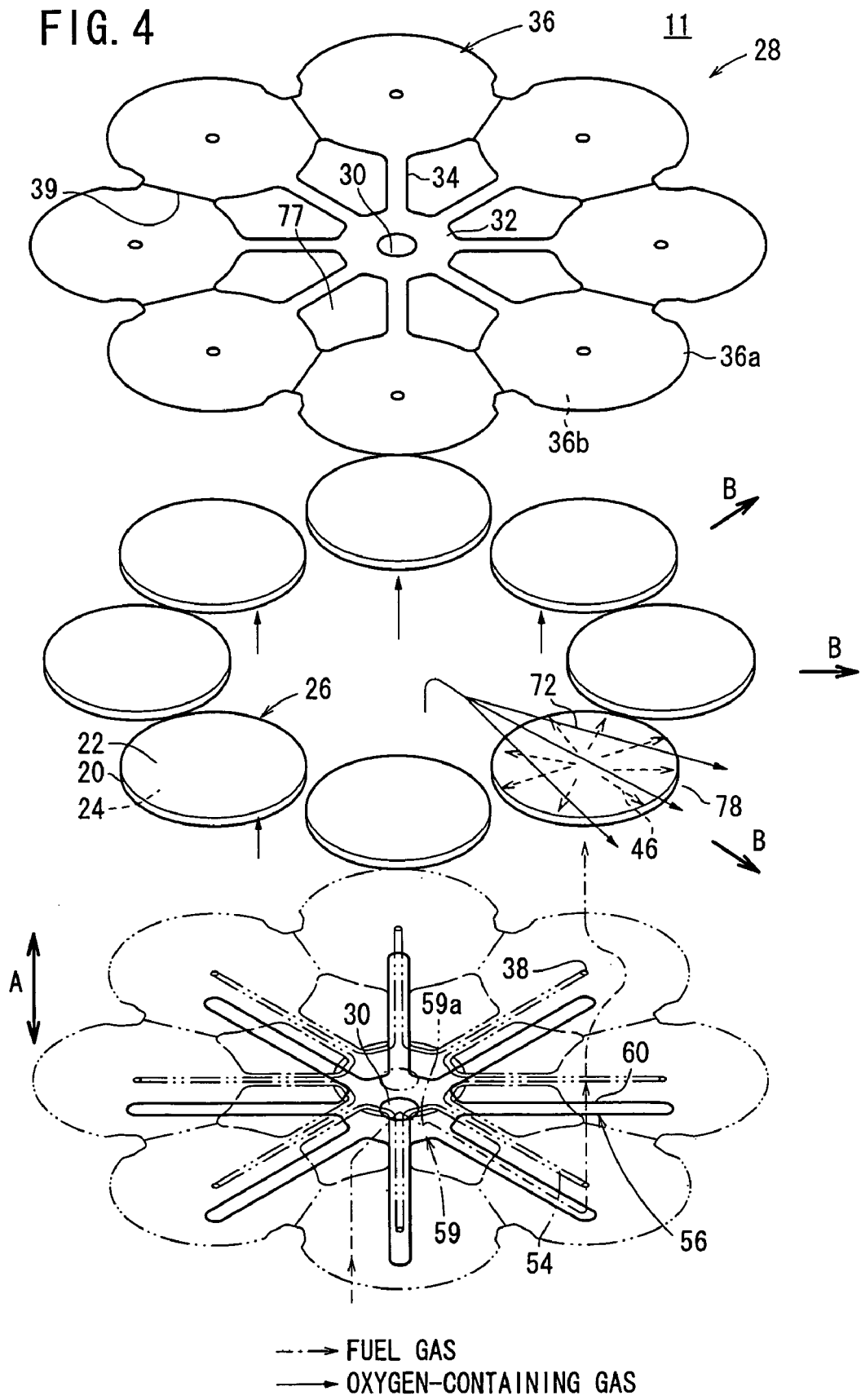
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central side of the separator 28) for preventing the entry of the oxygen-containing gas.

A plurality of, e.g., eight electrolyte electrode assemblies 26 are sandwiched between a pair of separators 28 to form the fuel cell 11. The eight electrolyte electrode assemblies 26 are concentric with a fuel gas supply passage (fuel gas supply unit) 30 extending through the center of the separators 28.

In FIG. 3, for example, each of the separators 28 comprises a single metal plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals).

The circular disk 36 and the electrolyte electrode assembly 26 have substantially the same size. A fuel gas inlet 38 for supplying the fuel gas is formed at the center of the electrolyte electrode assembly 26, or at an upstream position deviated from the center of the electrolyte electrode assembly 26 in the flow direction of the oxygen-containing gas. The adjacent circular disks 36 are separated from each other by a cutout 39.

Each of the circular disks 36 has a plurality of protrusions 48 on its surface 36a which contacts the anode 24. The protrusions 48 form a fuel gas channel 46 for supplying the fuel gas along an electrode surface of the anode 24. For example, the protrusions 48 are solid portions formed by etching on the surface 36a. Various shapes such as a square shape, a circular shape, a triangular shape, or a rectangular shape can be adopted as the cross sectional shape of the protrusions 48. The positions or the density of the protrusions 48 can be changed arbitrarily depending on the flow state of the fuel gas or the like.

Figure 5:
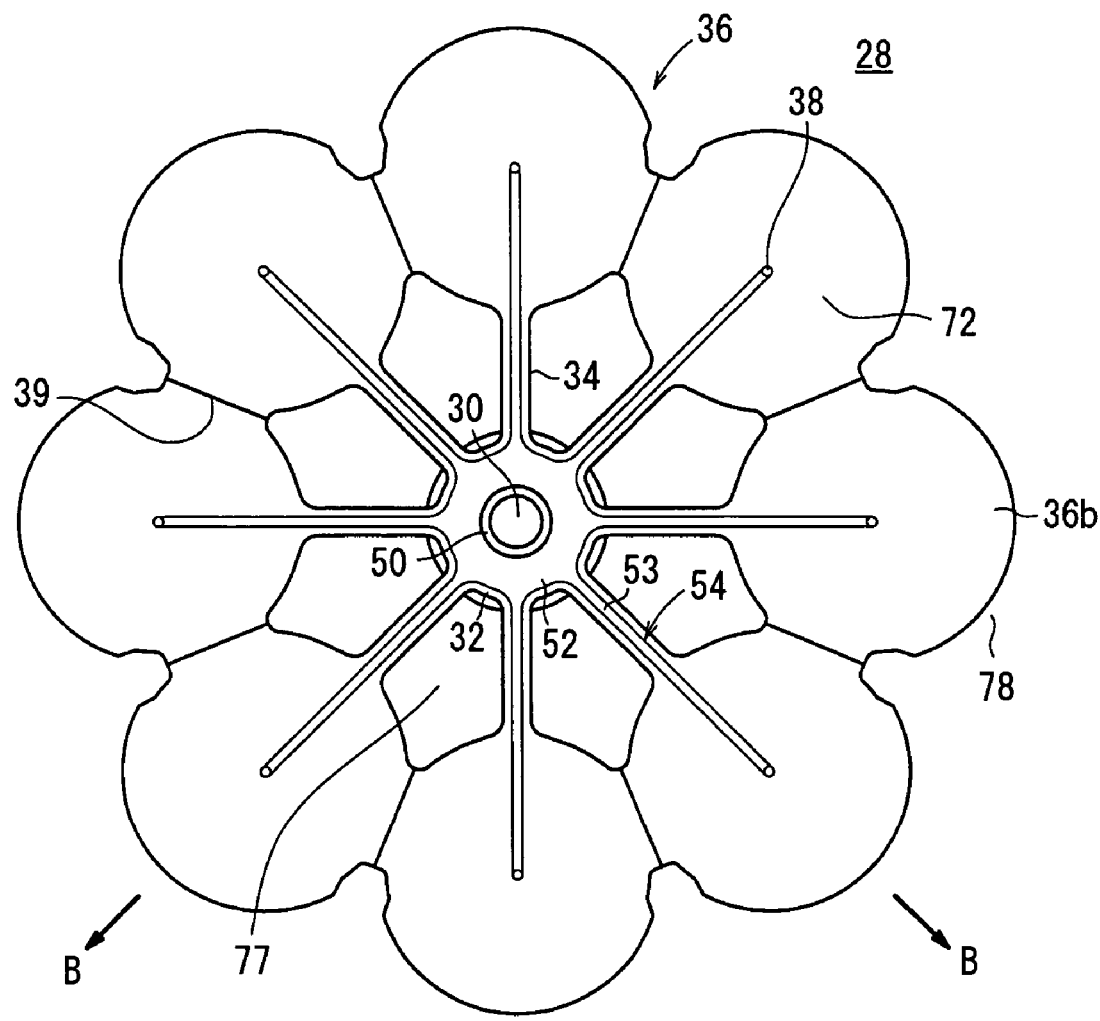
FIG. 5 is a front view showing a separator.
Figure 6:
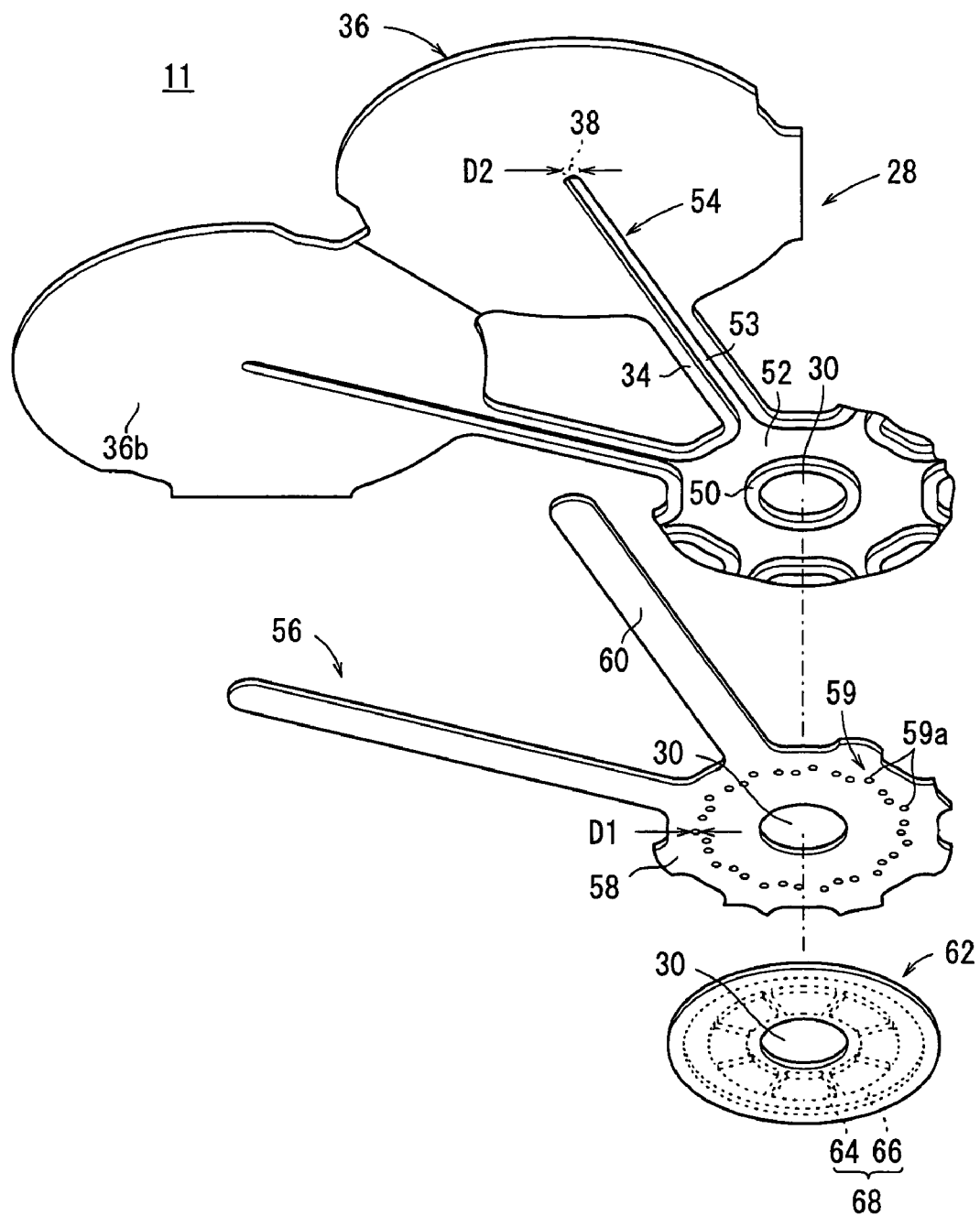
FIG. 6 is an exploded perspective view showing the separator, a channel lid member, and a circular disk member of the fuel cell.

As shown in FIGS. 5 and 6, each of the circular disks 36 has a substantially planar surface 36b which contacts the cathode 22. The first small diameter end portion 32 has a ring-shaped protrusion 50 around the fuel gas supply passage 30. A recess 52 is formed around the protrusion 50. A groove 53 is formed in each of the first bridges 34. The groove 53 connects the fuel gas supply passage 30 to the fuel gas inlet 38 through the recess 52. For example, the recess 52 and the groove 53 are fabricated by etching. The recess 52 and the groove 53 form a fuel gas supply channel 54.

As shown in FIG. 3, a channel lid member 56 is fixed to a surface of the separator 28 facing the cathodes 22, e.g., by brazing, laser welding or the like. As shown in FIGS. 3 and 6, the channel lid member 56 is a flat plate. A second small diameter end portion 58 is formed at the center of the channel lid member 56. The fuel gas supply passage 30 extends through the second small diameter end portion 58. The second small diameter end portion 58 has a plurality of holes $59a$ forming a filter mechanism 59 for filtering the fuel gas supplied from the fuel gas supply passage 30. The diameter (the cross sectional area of the opening) D1 of the hole $59a$ is smaller than the diameter (the cross sectional area of the opening) of the fuel gas inlet 38 ($D1 \leqq D2$).

Eight second bridges 60 extend radially from the second small diameter end portion 58. Each of the second bridges 60 is fixed to the separator 28, from the first bridge 34 to the surface $36b$ of the circular disk 36, covering the fuel gas inlet 38 (see FIG. 7).

A circular disk member (plate member) 62 is fixed to the channel lid member 56, covering the holes $59a$. A plurality of slits 64 connected to the fuel gas supply passage 30 are radially formed in the circular disk member 62. The slits 64 are connected to a recess 66. The slits 64 and the recess 66 form a channel unit 68 connecting the fuel gas supply passage 30 to the holes $59a$.

Figure 7:
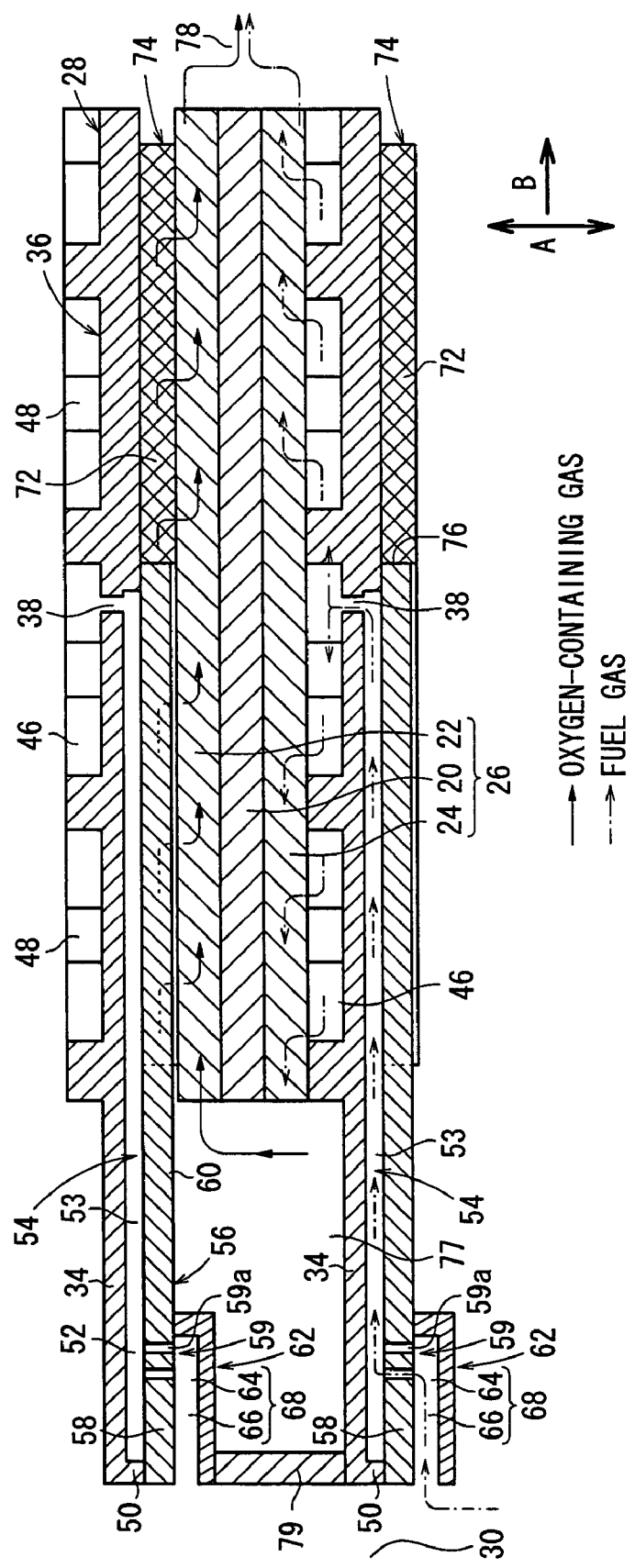
FIG. 7 is a cross sectional view schematically showing operation of the fuel cell.

As shown in FIGS. 3 and 7, a deformable elastic channel member such as an electrically conductive mesh member 74 is provided on the surface $36b$ of the circular disk 36. The mesh member 74 forms an oxygen-containing gas channel 72 for supplying the oxygen-containing gas along an electrode surface of the cathode 22. The mesh member 74 tightly contacts the cathode 22. For example, the mesh member 74 is made of wire rod material of stainless steel (SUS material), and has a substantially circular disk shape.

The thickness of the mesh member 74 is determined such that the mesh member 74 is deformed elastically desirably when a load in the stacking direction indicated by the arrow A is applied to the mesh member 74. The mesh member 74 has a cutout 76 as a space for providing the second bridge 60 of the channel lid member 56.

As shown in FIG. 7, the area where the mesh member 74 is provided is smaller than the area where the protrusions 48 are provided on the surface $36a$, i.e., smaller than the power generation area of the anode 24. The oxygen-containing gas channel 72 formed on the mesh member 74 is connected to the oxygen-containing gas supply unit 77. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 77 extends inside the respective circular disks 36 between the first bridges 34 in the stacking direction.

Insulating seals 79 for sealing the fuel gas supply passage 30 are provided between the separators 28. For example, the insulating seals 79 are made of mica material, or ceramic material. An exhaust gas channel 78 of the fuel cells 11 is formed outside the circular disks 36.

Figure 2:
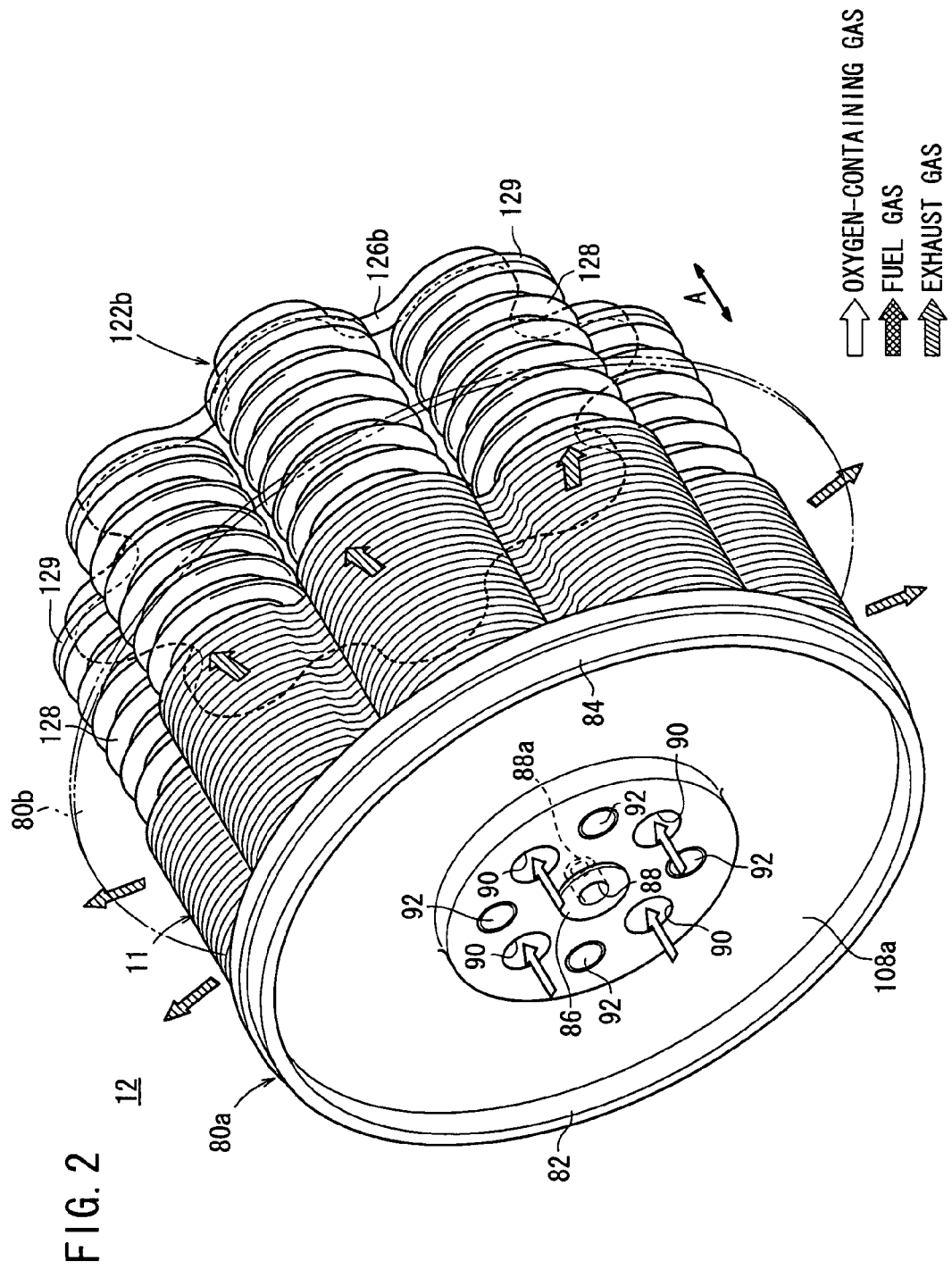
FIG. 2 is a perspective view schematically showing a fuel cell stack of the fuel cell system.

As shown in FIGS. 1 and 2, the fuel cell stack 12 includes end plates 80a, 80b provided at opposite ends of the fuel cells 11 in the stacking direction. The end plate 80a has a substantially circular disk shape. A ring shaped portion 82 protrudes from the outer circumferential end of the end plate 80a, and a groove 84 is formed around the ring shaped portion 82. A columnar projection 86 is formed at the center of the ring shaped portion 82. The columnar projection 86 protrudes in the same direction as the ring shaped portion 82. A stepped hole 88 is formed at the center in the projection 86.

Holes 90 and screw holes 92 are formed in the same virtual circle around the projection 86. The holes 90 and the screw holes 92 are arranged alternately, and spaced at predetermined angles (intervals), at positions corresponding to the respective spaces of the oxygen-containing gas supply unit 77 formed between the first and second bridges 34, 60. The diameter of the end plate 80b is larger than the diameter of the end plate 80a. The end plate 80a is an electrically conductive thin plate.

The casing 18 includes a first case unit 96a containing the load applying mechanism 21 and a second case unit 96b containing the fuel cell stack 12. The end plate 80b and an insulating member are sandwiched between the first case unit 96a and the second case unit 96b. The insulating member is provided on the side of the second case unit 96b. The joint portion between the first case unit 96a and the second case unit 96b is tightened by screws 98 and nuts 100. The end plate 80b functions as a gas barrier for preventing entry of the hot exhaust gas or the hot air from the fluid unit 19 into the load applying mechanism 21.

An end of a ring shaped wall plate 102 is joined to the second case unit 96b, and a head plate 104 is fixed to the other end of the wall plate 102. The fluid unit 19 is provided symmetrically with respect to the central axis of the fuel cell stack 12. Specifically, the substantially cylindrical reformer 16 is provided coaxially inside the substantially ring shaped heat exchanger 14.

A wall plate 106 is fixed to the groove 84 around the end plate 80a to form a chamber member 108. The heat exchanger 14 and the reformer 16 are directly connected to the chamber member 108. A chamber 108a is formed in the channel member 108, and the air heated at the heat exchanger 14 temporally fills the chamber 108a. The holes 90 are openings for supplying the air temporally filling in the chamber 108a to the fuel cell stack 12.

A fuel gas supply pipe 110 and a reformed gas supply pipe 112 are connected to the reformer 16. The fuel gas supply pipe 110 extends to the outside from the head plate 104. The reformed gas supply pipe 112 is inserted into the stepped hole 88 of the end plate 80a, and connected to the fuel gas supply passage 30.

An air supply pipe 114 and an exhaust gas pipe 116 are connected to the head plate 104. A channel 118 extending from the air supply pipe 114, and directly opened to the channel member 108 through the heat exchanger 14, and a channel 120 extending from the exhaust gas channel 78 of the fuel cell stack 12 to the exhaust gas pipe 116 through the heat exchanger 14 are provided in the casing 18.

The load applying mechanism 21 includes a first tightening unit 122a for applying a first tightening load T1 to a region around (near) the fuel gas supply passage 30 and a second tightening unit 122b for applying a second tightening load T2 to the electrolyte electrode assemblies 26. The second tightening load T2 is smaller than the first tightening load T1 (T1>T2).

The first tightening unit 122a includes short first tightening bolts 124a screwed into the screw holes 92 formed along one diagonal line of the end plate 80a. The first tightening bolts 124a extend in the stacking direction of the fuel cells 11, and engage a first presser plate 126a. The first tightening bolts 124a are provided in the oxygen-containing gas supply unit 77 extending through the separators 28. The first presser plate 126a is a narrow plate, and engages the central position of the separator 28 to cover the fuel gas supply passage 30.

The second tightening unit 122b includes long second tightening bolts 124b screwed into screw holes 92 formed along the other diagonal line of the end plate 80a. Ends of the second tightening bolts 124b extend through a second presser plate 126b having a curved outer section. Nuts 127 are fitted to the ends of the second tightening bolts 124b. The second tightening bolts 124b are provided in the oxygen-containing gas supply unit 77 extending through the separators 28. Springs 128 and spring seats 129 are provided in respective circular portions of the second presser plate 126b, at positions corresponding to the electrolyte electrode assemblies 26 on the circular disks 36 of the fuel cell 11. For example, the springs 128 are ceramics springs.

Next, operation of the fuel cell system 10 will be described below.

As shown in FIG. 3, in assembling the fuel cell system 10, firstly, the channel lid member 56 is joined to the surface of the separator 28 facing the cathodes 22, and the circular disk member 62 is joined to the channel lid member 56. Thus, a fuel gas supply channel 54 connected to the fuel gas supply passage 30 is formed between the separator 28, and the channel lid member 56 and the circular disk member 62. The fuel gas supply channel 54 is connected to the fuel gas channel 46 through the fuel gas inlet 38 (see FIG. 7). The ring shaped insulating seal 79 is provided on each of the separators 28 around the fuel gas supply passage 30, and the mesh member 74 is provided between the separator 28 and the cathode 22.

In this manner, the separator 28 is fabricated. The eight electrolyte electrode assemblies 26 are interposed between a pair of the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 38 is positioned at substantially the center in each of the anodes 24.

A plurality of the fuel cells 11 are stacked in the direction indicated by the arrow A, and the end plates 80a, 80b are provided at opposite ends in the stacking direction. As shown in FIGS. 1 and 2, on the end plate 80b side, the first presser plate 126a of the first tightening unit 122a is provided at a position corresponding to the center of the fuel cell 11.

In this state, the short first tightening bolts 124a are inserted through the first presser plate 126a and the end plate 80b toward the end plate 80a. Tip ends of the first tightening bolts 124a are screwed into, and fitted to the screw holes 92 formed along one of the diagonal lines of the end plate 80a. The heads of the first tightening bolts 124a engage the first presser plate 126a. The first tightening bolts 124a are rotated in the screw holes 92 to adjust the surface pressure of the first presser plate 126a. In this manner, in the fuel cell stack 12, the first tightening load T1 is applied to the region near the fuel gas supply passage 30.

Then, the springs 128 and the spring seats 129 are aligned axially with the electrolyte electrode assemblies 26 at respective positions of the circular disks 36. The second presser plate 126b of the second tightening unit 122b engages the spring seats 129 provided at one end of the springs 128.

Then, the long second tightening bolts 124b are inserted through the second presser plate 126b and the end plate 80b toward the end plate 80a. The tip end of the second tightening bolts 124b are screwed into, and fitted to the screw holes 92 formed along the other diagonal line of the end plate 80a. The nuts 127 are fitted to the heads of the second tightening bolts 124b. Therefore, by adjusting the state of the screw engagement between the nuts 127 and the second tightening bolts 124b, the second tightening load T2 is applied to the electrolyte electrode assemblies 26 by the elastic force of the respective springs 128.

The end plate 80b of the fuel cell stack 12 is sandwiched between the first case unit 96a and the second case unit 96b of the casing 18. The first case unit 96a and the second case unit 96b are fixed together by the screws 98 and the nuts 100. The fluid unit 19 is mounted in the second case unit 96b. The wall plate 106 of the fluid unit 19 is attached to the groove 84 around the end plate 80a. Thus, the channel member 108 is formed between the end plate 80a and the wall plate 106.

Next, in the fuel cell system 10, as shown in FIG. 1, a fuel (methane, ethane, propane, or the like) and, as necessary, water are supplied from the fuel gas supply pipe 110, and an oxygen-containing gas (hereinafter referred to as the "air") is supplied from the air supply pipe 114.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 54 in the separator 28 through the holes 59a from the channel unit 68 of the circular disk member 62 of each fuel cell 11 (see FIG. 7).

The fuel gas flows along the fuel gas supply channel 54 between the first and second bridges 34, 60, and flows into the fuel gas channel 46 formed by the protrusions 48 from the fuel gas inlets 38 of the circular disks 36. The fuel gas inlets 38 are formed at positions corresponding to central regions of the anodes 24 of the electrolyte electrode assemblies 26. Thus, the fuel gas is supplied to from the fuel gas inlets 38 to the substantially central positions of the anodes 24, and flows outwardly from the central regions of the anodes 24 along the fuel gas channel 46.

As shown in FIG. 1, the air from the air supply pipe 114 flows through the channel 118 of the heat exchanger 14, and temporarily flows into the chamber 108a. The air flows through the holes 90 connected to the chamber 108a, and is supplied to the oxygen-containing gas supply unit 77 provided at substantially the center of the fuel cells 11. At this time, in the heat exchanger 14, as described later, since the exhaust gas discharged to the exhaust gas channel 78 flows through the channel 120, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 77 flows into the space between the inner circumferential edge of the electrolyte electrode assembly 26 and the inner circumferential edge of the circular disk 36 in the direction indicated by the arrow B, and flows toward the oxygen-containing gas channel 72 formed by the mesh member 74. As shown in FIG. 7, in the oxygen-containing gas channel 72, the oxygen-containing gas flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the oxygen-containing gas flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 78 in the stacking direction. When the exhaust gas flows through the channel 120 of the heat exchanger 14, heat exchange between the exhaust gas and the air is carried out. Then, the exhaust gas is discharged into the exhaust gas pipe 116.

In the first embodiment, as shown in FIGS. 6 and 7, the fuel gas supply channel 54 connected to the fuel gas supply passage 30 and the fuel gas inlet 38 are formed in the separator 28, the channel lid member 56, and the circular disk member 62. The filter mechanism 59 for filtering the fuel gas supplied from the fuel gas supply passage 30 to the channel unit 68 is formed in the fuel gas supply channel 54.

In the structure, impurities such as dust that may be contained in the fuel gas are blocked by the holes 59a of the filter mechanism 59, and do not enter the groove 53. After removal of the impurities, the fuel gas is supplied to the fuel gas channel 46, and thus, the desired power generation performance is achieved.

Further, the filter mechanism 59 is provided in the fuel cell 11. Therefore, in comparison with the conventional structure in which a dust collector or the like is provided outside the fuel cell 11, the overall size of the fuel cells 11, i.e., the fuel cell stack 12 is reduced significantly. Further, it is possible to remove dust or the like that may be raised in pipes or insulating material in the reformer 16 or the fuel cells 11, and that cannot be collected by the external dust collector.

Further, in the first embodiment, the diameter D1 of the hole 59a is smaller than the diameter D2 of the fuel gas inlet 38. Thus, large impurities that would close the fuel gas inlet 38 are blocked by any of the holes 59a, and collected by the filter mechanism 59. Therefore, it is possible to supply the desired fuel gas from the fuel gas inlet 38 to the electrode surface of the anode 24 smoothly and reliably.

The anode 24 of the electrolyte electrode assembly 26 contacts the protrusions 48 on the circular disk 36. The cathode 22 of the electrolyte electrode assembly 26 contacts the mesh member 74. In this state, the load in the stacking direction indicated by the arrow A is applied to the components of the fuel cell 11. Since the mesh member 74 is deformable, the mesh member 74 tightly contacts the cathode 22.

In the structure, the dimensional errors or distortions that occur at the time of production in the electrolyte electrode assembly 26 or the separator 28 can suitably be absorbed by elastic deformation of the mesh member 74. Thus, in the first embodiment, damage at the time of stacking the components of the fuel cell 11 is prevented. Since the components of the fuel cell 11 contact each other at many points, improvement in the performance of collecting electricity from the fuel cell 11 is achieved.

The load in the stacking direction is efficiently transmitted through the protrusions 48 on the circular disk 36. Therefore, the fuel cells 11 can be stacked together with a small load, and distortion in the electrolyte electrode assemblies 26 and the separators 28 is reduced. In particular, even in the case of using the electrolyte electrode assembly 26 with small strength, having the thin electrolyte 20 and the thin cathode 22 (so called anode supported cell type MEA), the stress applied to the electrolyte 20 and the cathode 22 is released by the mesh member 74, and reduction in the damage is achieved advantageously.

The protrusions 48 on the surface 36a of the circular disk 36 are formed by etching or the like as solid portions. Thus, the shape, the positions, and the density of the protrusions 48 can be changed arbitrarily and easily, e.g., depending on the flow state of the fuel gas economically, and the desired flow of the fuel gas is achieved. Further, since the protrusions 48 are formed as solid portions, the protrusions 48 are not deformed, and thus, the load is transmitted through the protrusions 48, and electricity is collected through the protrusions 48 efficiently.

Further, in the first embodiment, the fuel gas supply passage 30 is provided hermetically inside the oxygen-containing gas supply unit 77, and the fuel gas supply channel 54 is provided along the separator surface. Therefore, the fuel gas before consumption is heated by the hot oxygen-containing gas which has been heated by the heat exchange at the heat exchanger 14. Thus, improvement in the heat efficiency is achieved.

Further, the exhaust gas channel 78 is provided around the separators 28. The exhaust gas channel 78 makes it possible to prevent heat radiation from inside of the separators 28. Further, the fuel gas inlet 38 is provided at the center of the circular disk 36, or provided at an upstream position deviated from the center of the circular disk 36 in the flow direction of the oxygen-containing gas. Therefore, the fuel gas supplied from the fuel gas inlet 38 is diffused radially from the center of the anode 24 easily. Thus, the uniform reaction occurs smoothly, and improvement in the fuel utilization ratio is achieved.

Further, the area where the mesh member 74 is provided is smaller than the power generation area of the anode 24 (see FIG. 7). Therefore, even if the exhaust gas flows around to the anode 24 from the outside of the electrolyte electrode assembly 26, the power generation area is not present in the outer circumferential edge of the cathode 22 opposite to the outer circumferential edge of the anode 24. Thus, fuel consumption by the circulating current does not increase significantly, and a large electromotive force can be collected easily. Accordingly, the performance of collecting electricity is improved, and the fuel utilization ratio is achieved advantageously. Further, the present invention can be carried out simply by using the mesh member 74 as the elastic channel member. Thus, the structure of the present invention is simplified economically.

Further, the eight electrolyte electrode assemblies 26 are arranged along a virtual circle concentric with the separator 28. Thus, the overall size of the fuel cell 11 is small, and the influence of the heat distortion can be avoided.

Figure 8:
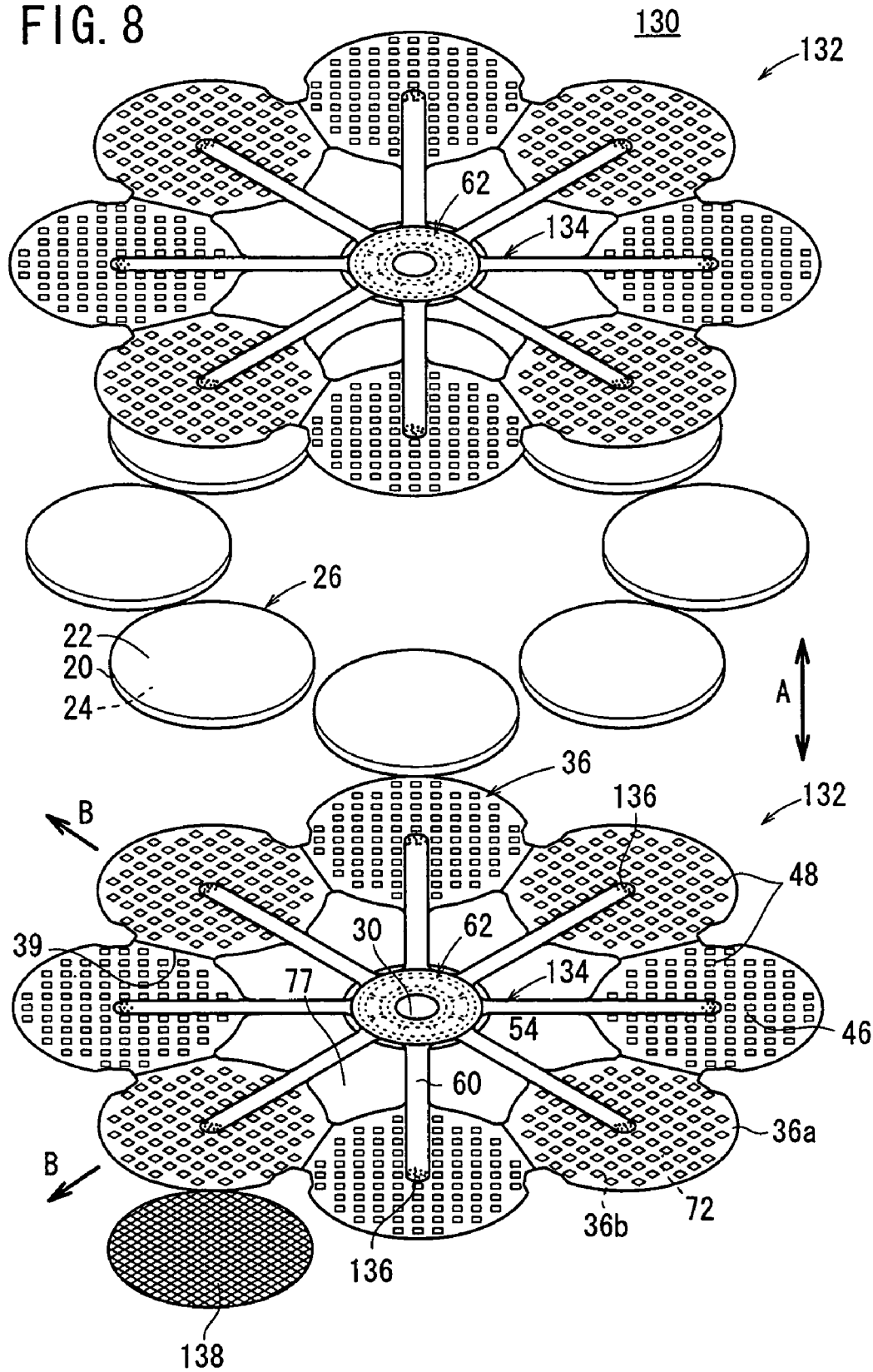
FIG. 8 is an exploded perspective view showing a fuel cell according to a second embodiment of the present invention.

FIG. 8 is an exploded perspective view showing a fuel cell 130 according to a second embodiment of the present invention. The constituent elements that are identical to those of the fuel cell 11 according to the first embodiment are labeled with the same reference numeral, and description thereof will be omitted. In the third to seventh embodiments as described later, the constituent elements that are identical to those of the fuel cell 11 according to the first embodiment are labeled with the same reference numeral, and description thereof will be omitted.

Figure 9:
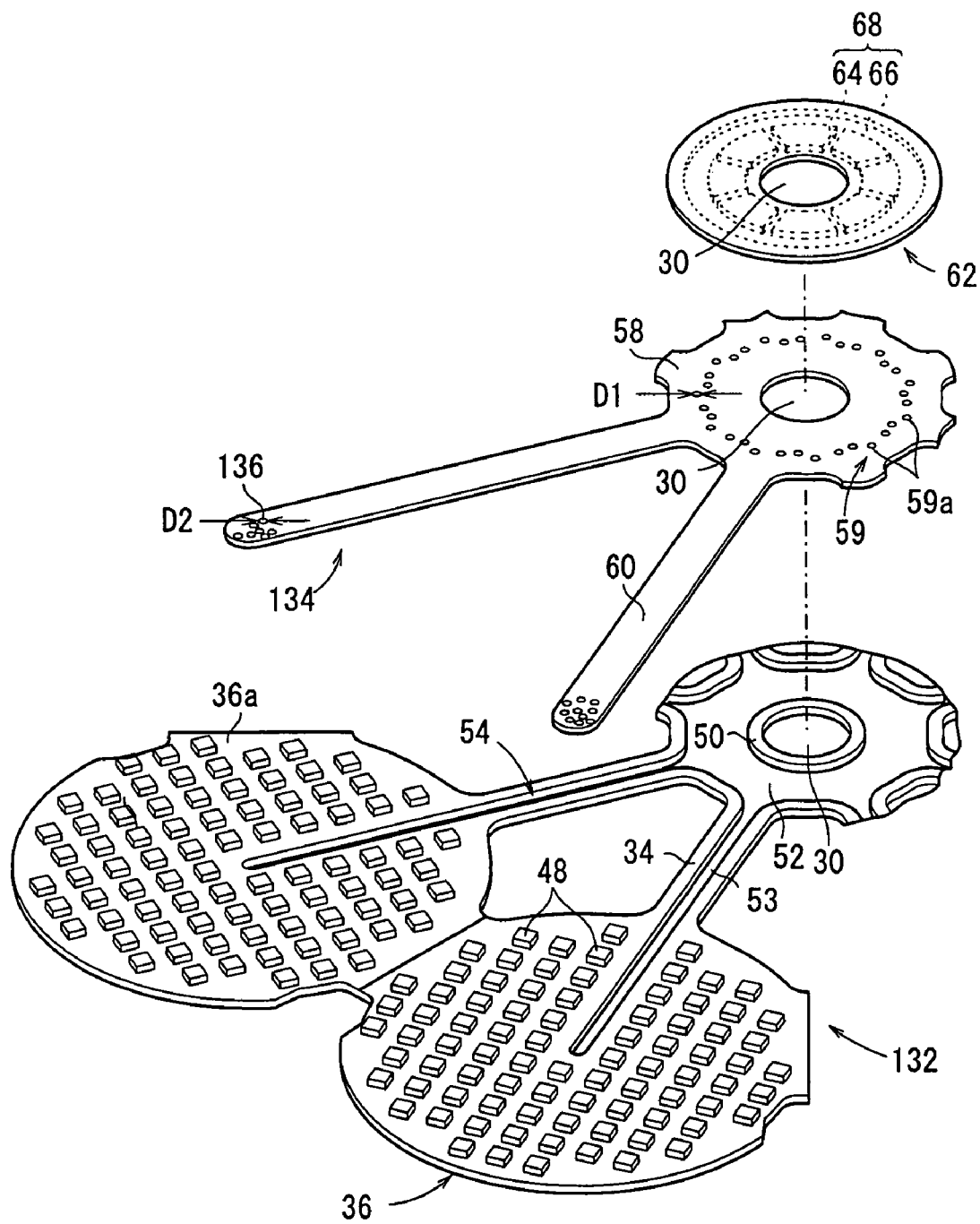
FIG. 9 is an exploded perspective view showing a separator, a channel lid member, and a circular disk member of the fuel cell.

In the fuel cell 130, a channel lid member 134 is fixed to a surface of the separator 132 facing the anodes 24, and the circular disk member 62 is fixed to the channel lid member 134. As shown in FIG. 9, a protrusion 50, a recess 52, and grooves 53 are formed on a surface 36a of the separator 132 facing the anodes 24 by, e.g., etching.

Figure 10:
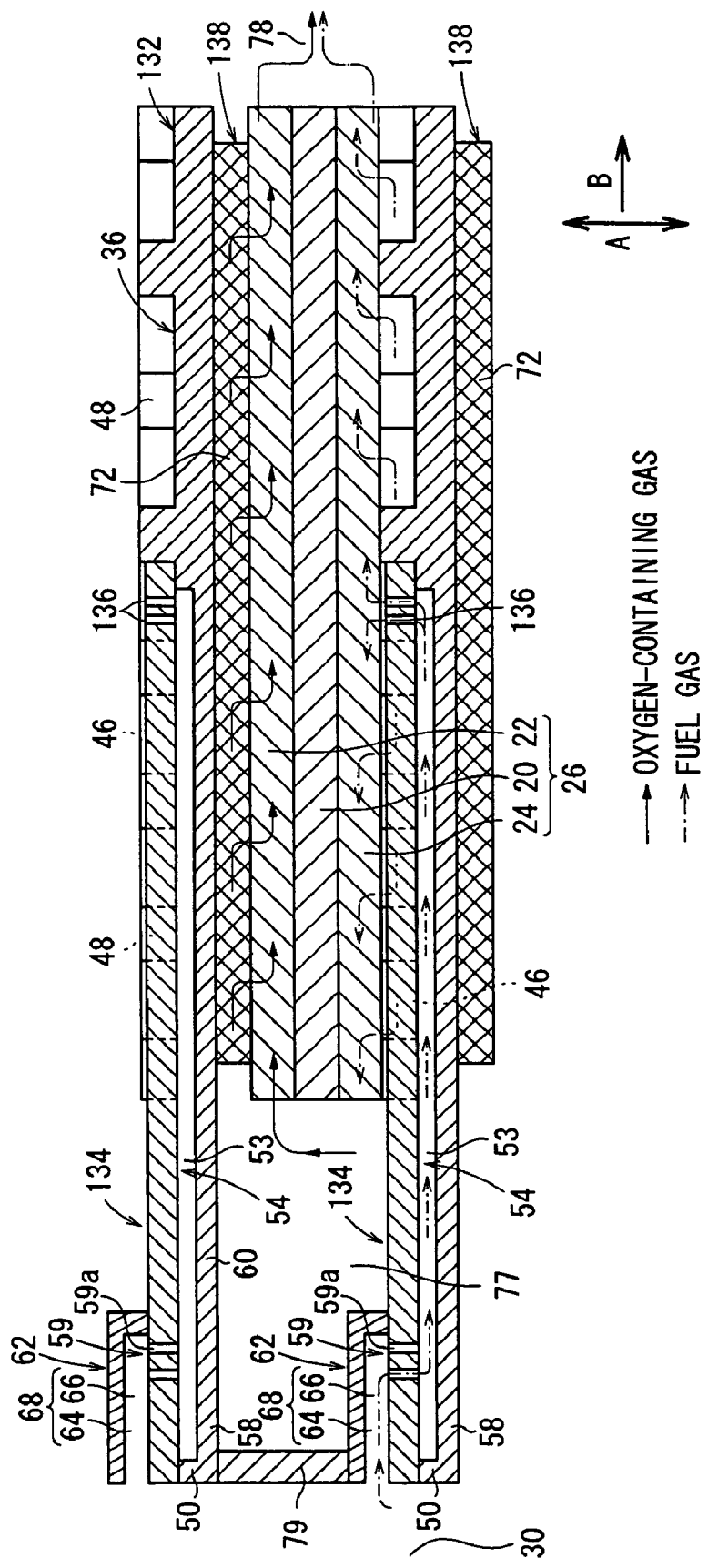
FIG. 10 is a cross sectional view schematically showing operation of the fuel cell.

As shown in FIGS. 8 and 10, the channel lid member 134 has a planar shape, and a plurality of fuel gas inlets 136 are formed at the front ends of the second bridges 60. The diameter (the cross sectional area of the opening) D1 of the hole 59a is smaller than the diameter (the cross sectional area of the opening) D2 of the fuel gas inlet 136 (D1≦D2).

An elastic channel member such as an electrically conductive mesh member 138 is provided on the surface 36b of the circular disk 36. The mesh member 138 has a circular disk shape. The cutout 76 of the mesh member 74 is not required for the mesh member 138, and no fuel gas inlets 38 are required in the circular disks 36.

In the second embodiment, the fuel gas supplied to the fuel gas supply passage 30 flows into the fuel gas supply channel 54 in the separator 28 through the holes 59a from the channel unit 68 of the circular disk member 62 of each fuel cell 11. Further, the fuel gas is supplied toward the anode 24 from the fuel gas inlets 136 formed at the front end of each of the second bridges 60 of the channel lid member 134.

The air flows from the oxygen-containing gas supply unit 77 to the oxygen-containing gas channel 72 formed in the mesh member 138 interposed between the cathode 22 and each of the circular disks 36. The air flows in the direction indicate by the arrow B, and is supplied to the cathode 22.

Figure 11:
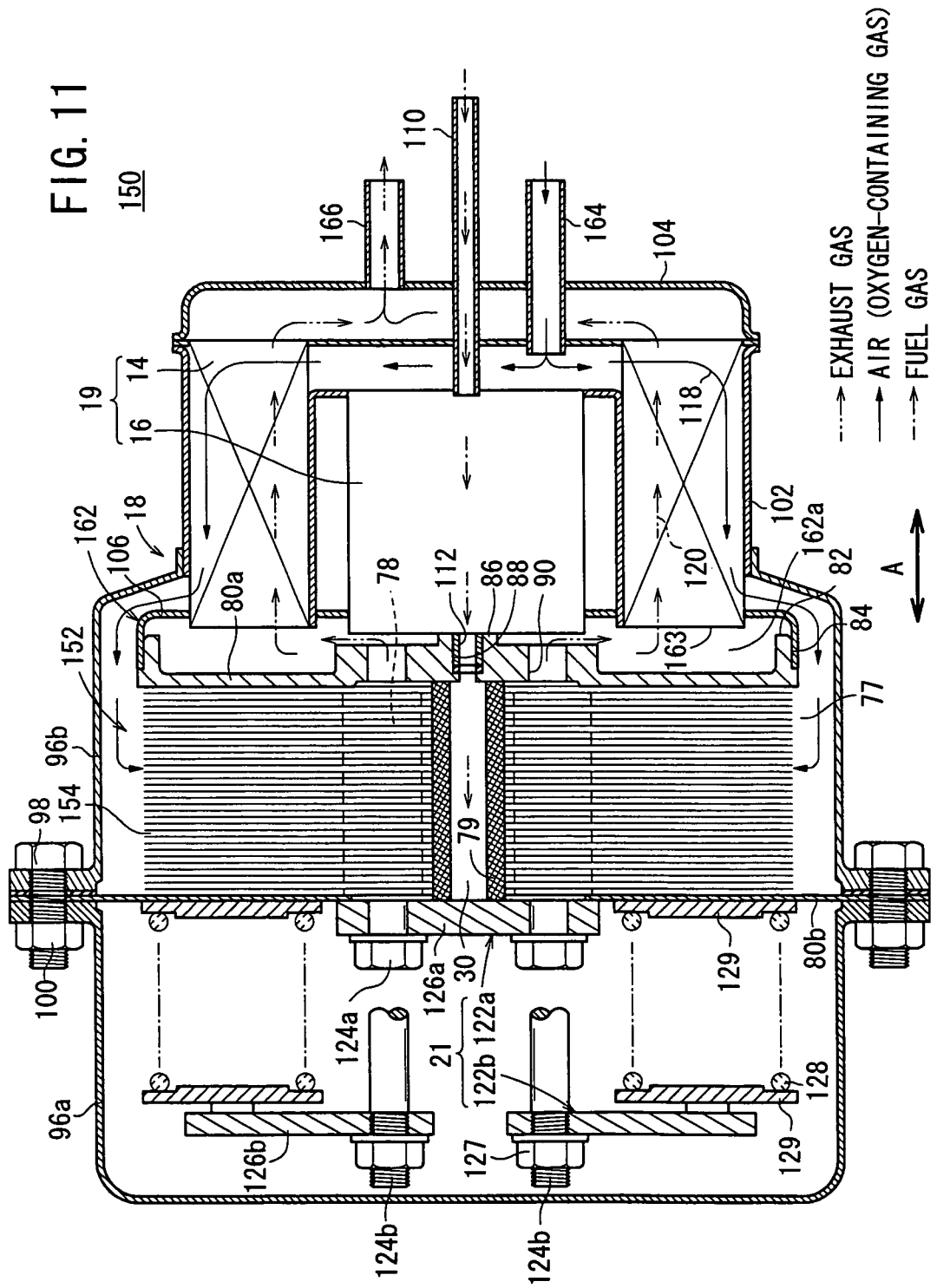
FIG. 11 is a partial cross sectional view showing a fuel cell system according to a third embodiment of the present invention.

FIG. 11 is a cross sectional view showing a fuel cell system 150 according to a third embodiment of the present invention.

The fuel cell system 150 includes a fuel cell stack 152 provided in the casing 18. The fuel cell stack 152 is formed by stacking a plurality of fuel cells 154 in the direction indicated by the arrow A. The fuel cell stack 152 is sandwiched between the end plates 80a, 80b.

Figure 12:
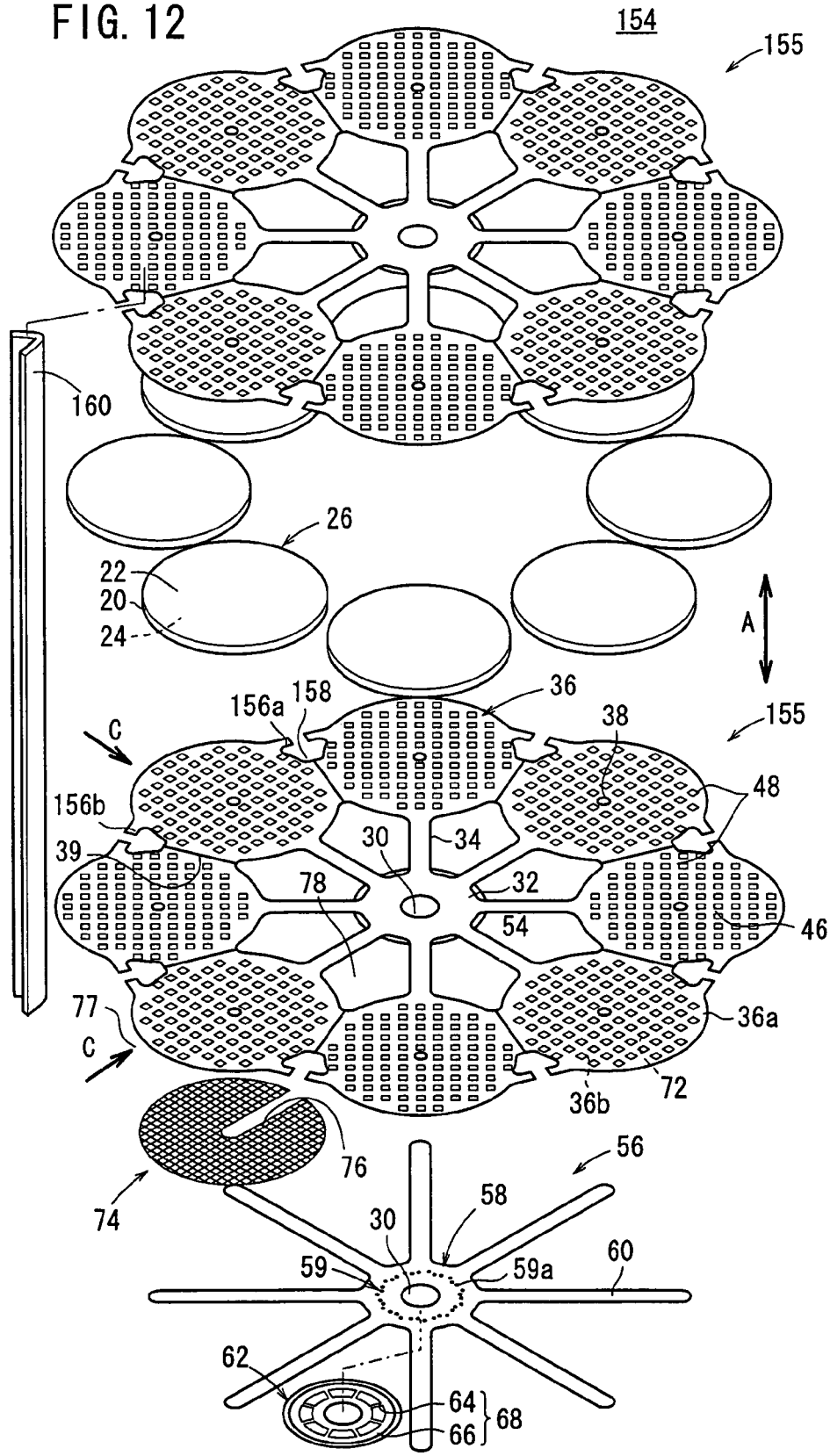
FIG. 12 is an exploded perspective view showing a fuel cell of the fuel cell system.
Figure 13:
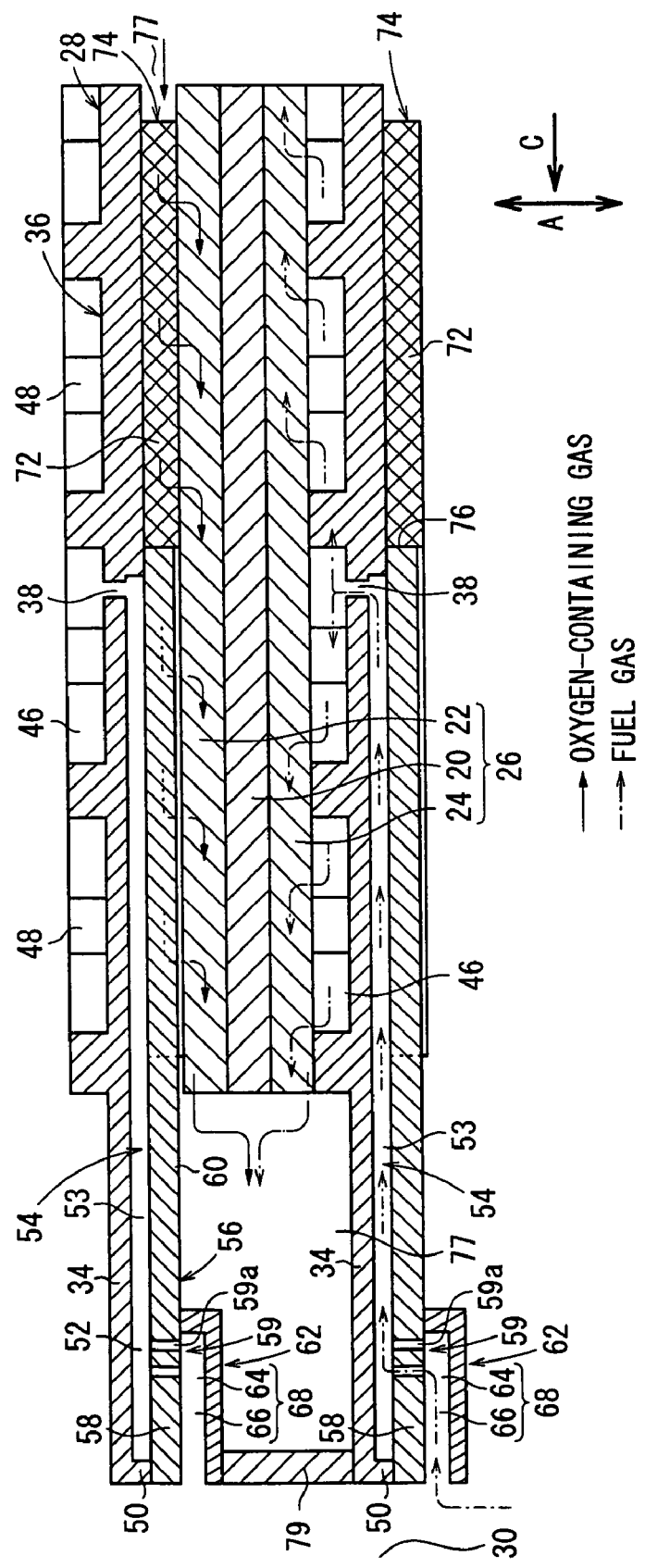
FIG. 13 is a partial exploded perspective view showing gas flows in the fuel cell.

As shown in FIGS. 12 and 13, in the fuel cell 154, the oxygen-containing gas flows along the cathode 22 of the electrolyte electrode assembly 26 in the direction indicated by an arrow C from the outer circumferential edge to the inner circumferential edge of the cathode 22, i.e., in the direction opposite to the flow direction in the cases of the first and second embodiments.

In the separators 155 of the fuel cell 154, an oxygen-containing gas supply unit 77 is provided outside the circular disks 36. An exhaust gas channel 78 is formed by spaces between the first bridges 34 inside the circular disks 36 and the circle disks 36. The exhaust gas channel 78 extends in the stacking direction. Each of the circular disks 36 includes extensions 156a, 156b protruding toward the adjacent circular disks 36 on both sides, respectively. Spaces 158 are formed between the adjacent extensions 156a, 156b, and baffle plates 160 extend along the respective spaces 158 in the stacking direction.

As show in FIG. 13, the oxygen-containing gas channel 72 is connected to the oxygen-containing gas supply unit 77 for supplying the oxygen-containing gas from the space between the outer circumferential edge of the circular disk 36 and the outer circumferential edge of the electrolyte electrode assembly 26 in the direction indicated by the arrow C. The oxygen-containing gas supply unit 77 is formed around the separators 155 including the area outside the extensions 156a, 156b of the circular disks 36 (see FIG. 12).

As shown in FIG. 11, a channel member 162 having a chamber 162a connected to the exhaust gas channel 78 through the holes 90 is formed at the end plate 80a. The exhaust gas discharged from the fuel cells 154 temporarily fills in the chamber 162a. The exhaust gas flows through the channel 120 in the heat exchanger 14 through an opening 163 opened directly to the chamber 162a.

An air supply pipe 164 and an exhaust gas pipe 166 are connected to the head plate 104. The air supply pipe 164 extends up to a position near the reformer 16. An end of the exhaust gas pipe 166 is connected to the head plate 104.

In the third embodiment, the fuel gas flows from the fuel gas supply pipe 110 to the fuel gas supply passage 30 through the reformer 16. The air as the oxygen-containing gas flows from the air supply pipe 164 into the channel 118 of the heat exchanger 14, and is supplied to the oxygen-containing gas supply unit 77 outside the fuel cells 154. As shown in FIG. 13, the air flows from the spaces between the outer circumferential edge of the electrolyte electrode assembly 26 and the outer circumferential edge of the circular disk 36 in the direction indicated by the arrow C, and supplied to the oxygen-containing gas channel 72 formed by the mesh member 74.

Thus, power generation is performed in each of the electrolyte electrode assemblies 26. The exhaust gas as the mixture of the fuel gas and the air after consumption in the reactions of the power generation flows in the stacking direction through the exhaust gas channel 78 in the separators 155. The exhaust gas flows through the holes 90, and temporarily fills the chamber 162a in the channel member 162 formed at the end plate 80a (see FIG. 11). Further, when the exhaust gas flows through the channel 120 of the heat exchanger 14, heat exchange is performed between the exhaust gas and the air. Then, the exhaust gas is discharged into the exhaust gas pipe 166.

In the third embodiment, the fuel gas supply passage 30 is provided hermetically inside the exhaust gas channel 78, and the fuel gas supply channel 54 is provided along the separator surface. Therefore, the fuel gas flowing through the fuel gas supply passage 30 before consumption is heated by the heat of the exhaust gas discharged into the exhaust gas channel 78.

Further, since the exhaust gas channel 78 extends through the central part of the separators 155, it is possible to heat the separators 155 radially from the central part by the heat of the exhaust gas, and improvement in the heat efficiency is achieved.

Figure 14:
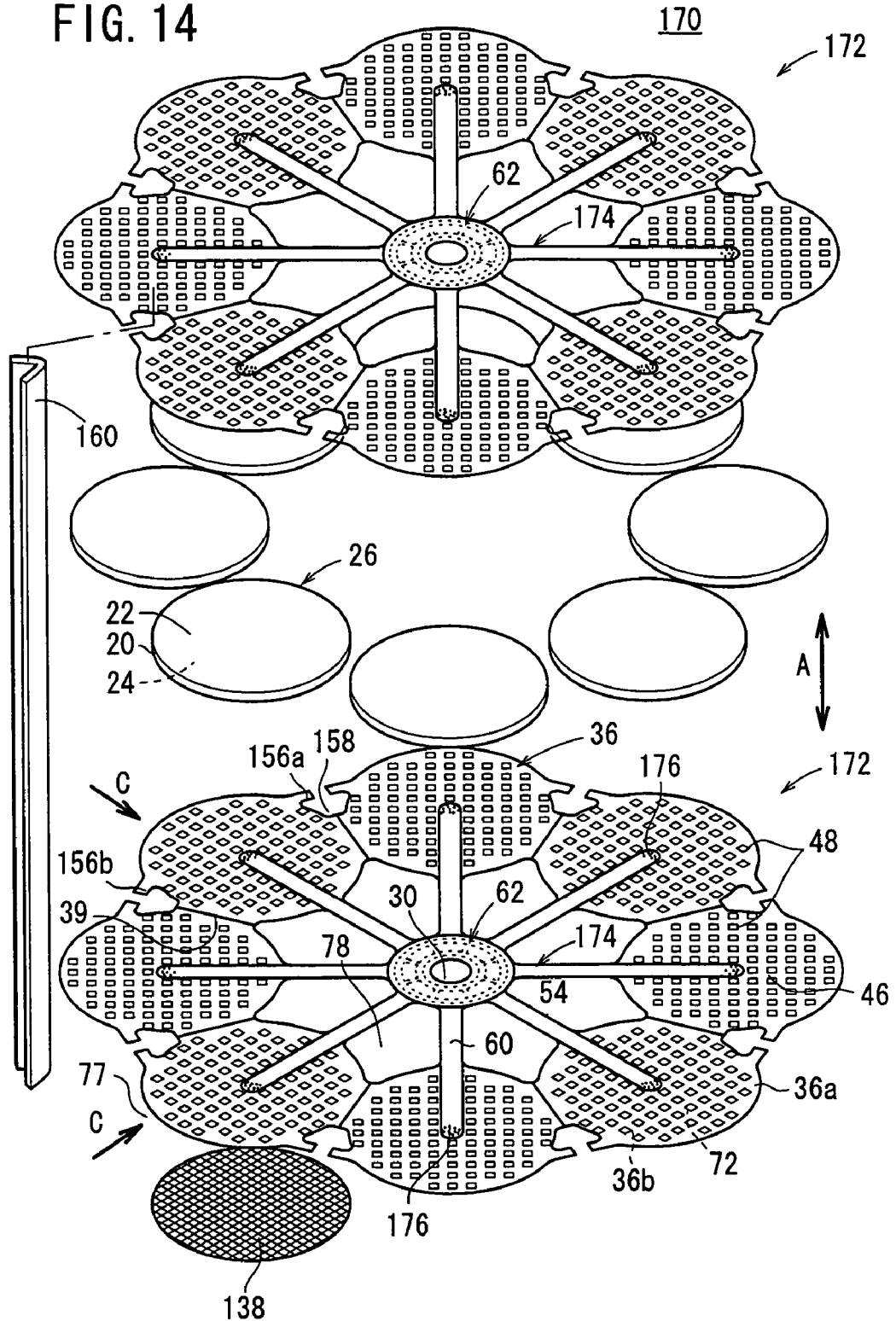
FIG. 14 is an exploded perspective view showing a fuel cell according to a fourth embodiment of the present invention.

FIG. 14 is an exploded perspective view showing a fuel cell 170 according to a fourth embodiment of the present invention.

In the fuel cell 170, a channel lid member 174 is fixed to a surface of a separator 172 facing the anode 24. Further, the channel lid member 174 is fixed to the circular disk member 62. The channel lid member 174 has a flat shape. A plurality of fuel gas inlets 176 are formed at the front ends of the second bridges 60. The fuel gas inlets 176 are opened to the anode 24.

Figure 15:
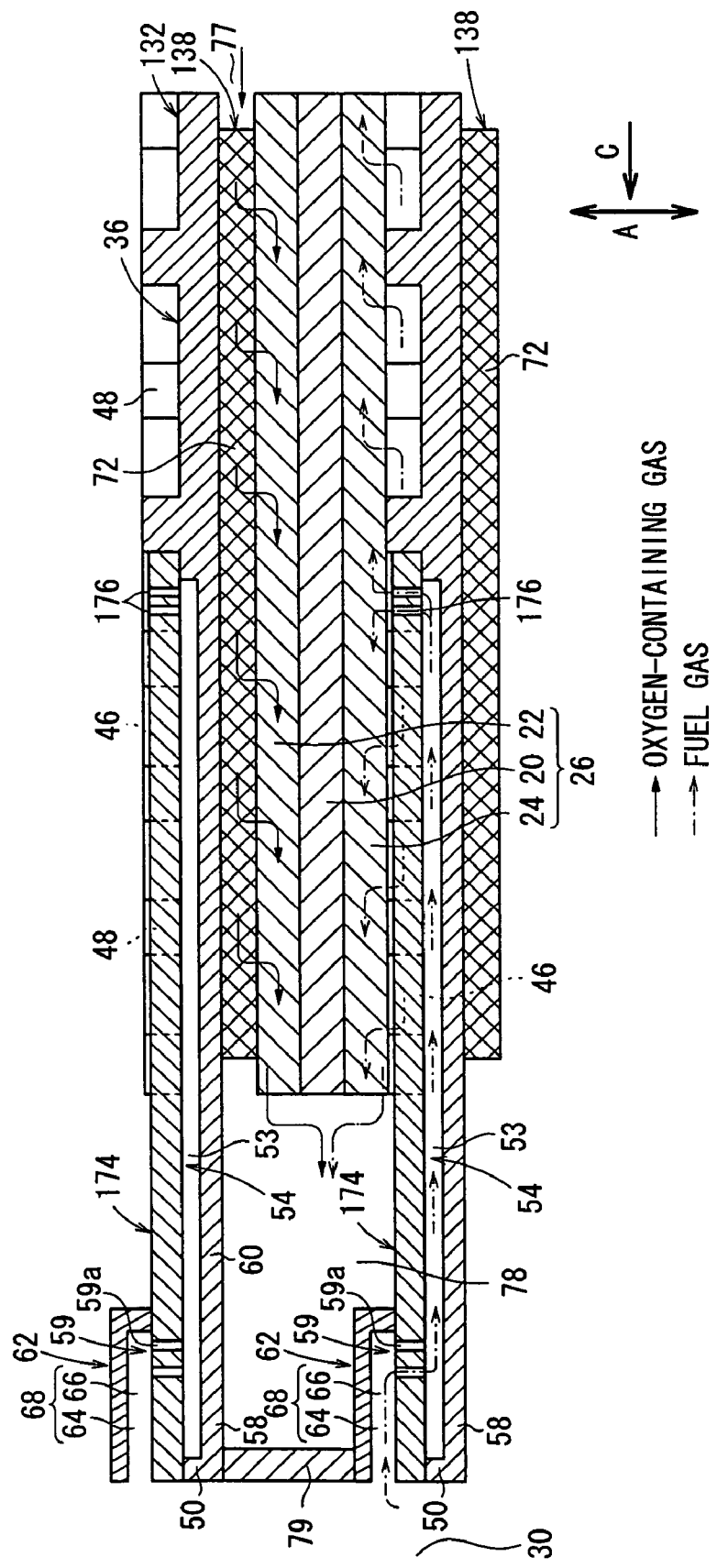
FIG. 15 is a cross sectional view schematically showing operation of the fuel cell.

In the fourth embodiment having the above structure, the oxygen-containing gas, the fuel gas, and the exhaust gas flow as shown in FIG. 15.

Figure 16:
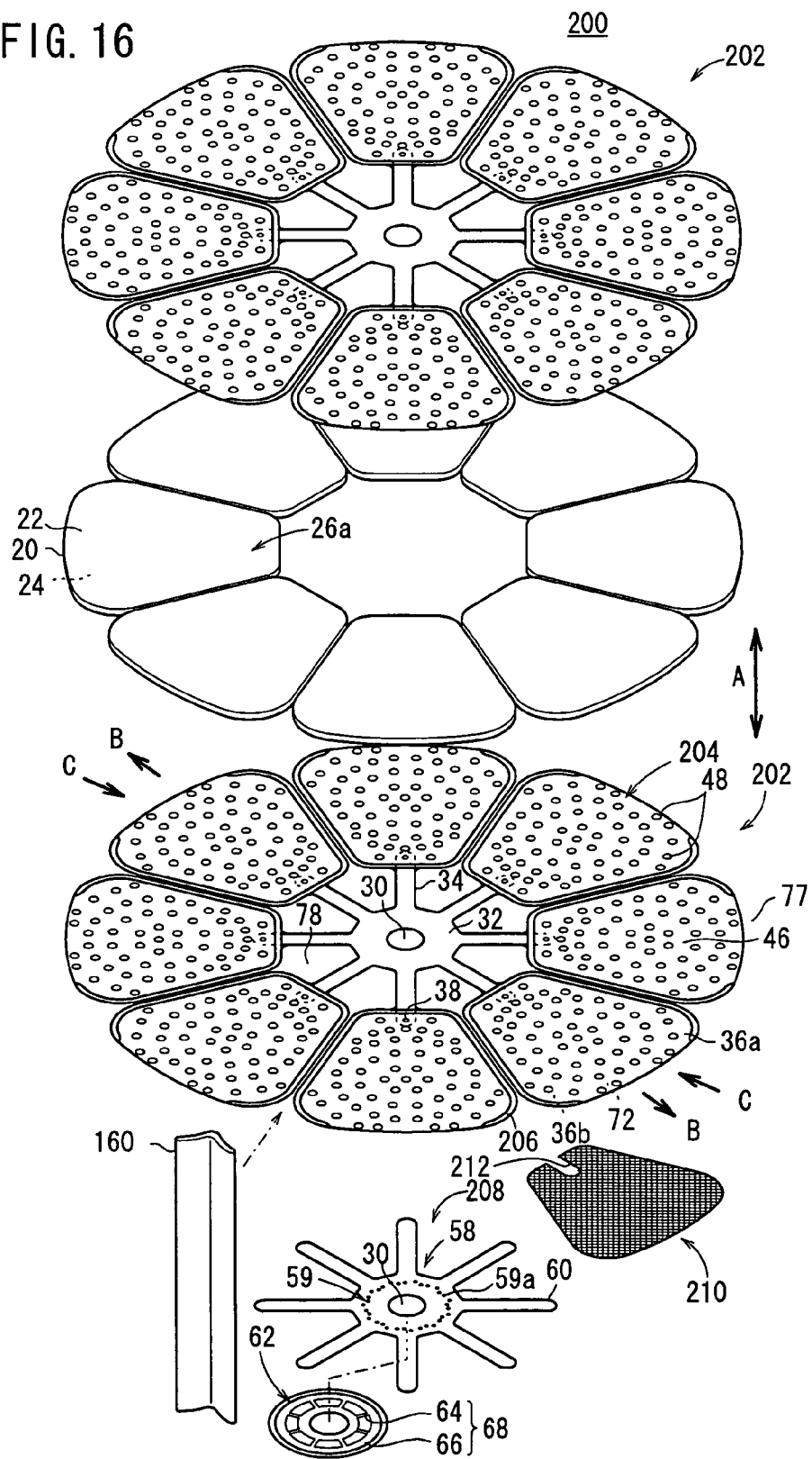
FIG. 16 is an exploded perspective view showing a fuel cell according to a fifth embodiment of the present invention.

FIG. 16 is an exploded perspective view showing a fuel cell 200 according to a fifth embodiment of the present invention.

The fuel cell 200 includes electrolyte electrode assemblies 26a having a substantially trapezoidal shape. Eight electrolyte electrode assemblies 26a are sandwiched between a pair of separators 202. The separator 202 includes trapezoidal sections 204 corresponding to the shape of the electrolyte electrode assemblies 26a. A plurality of protrusions 48 and a seal 206 are formed on a surface 36a of the trapezoidal section 204 facing the anode 24 by e.g., etching. The seal 206 is formed around the outer edge of the trapezoidal section 204, except the outer circumferential portion.

Figure 17:
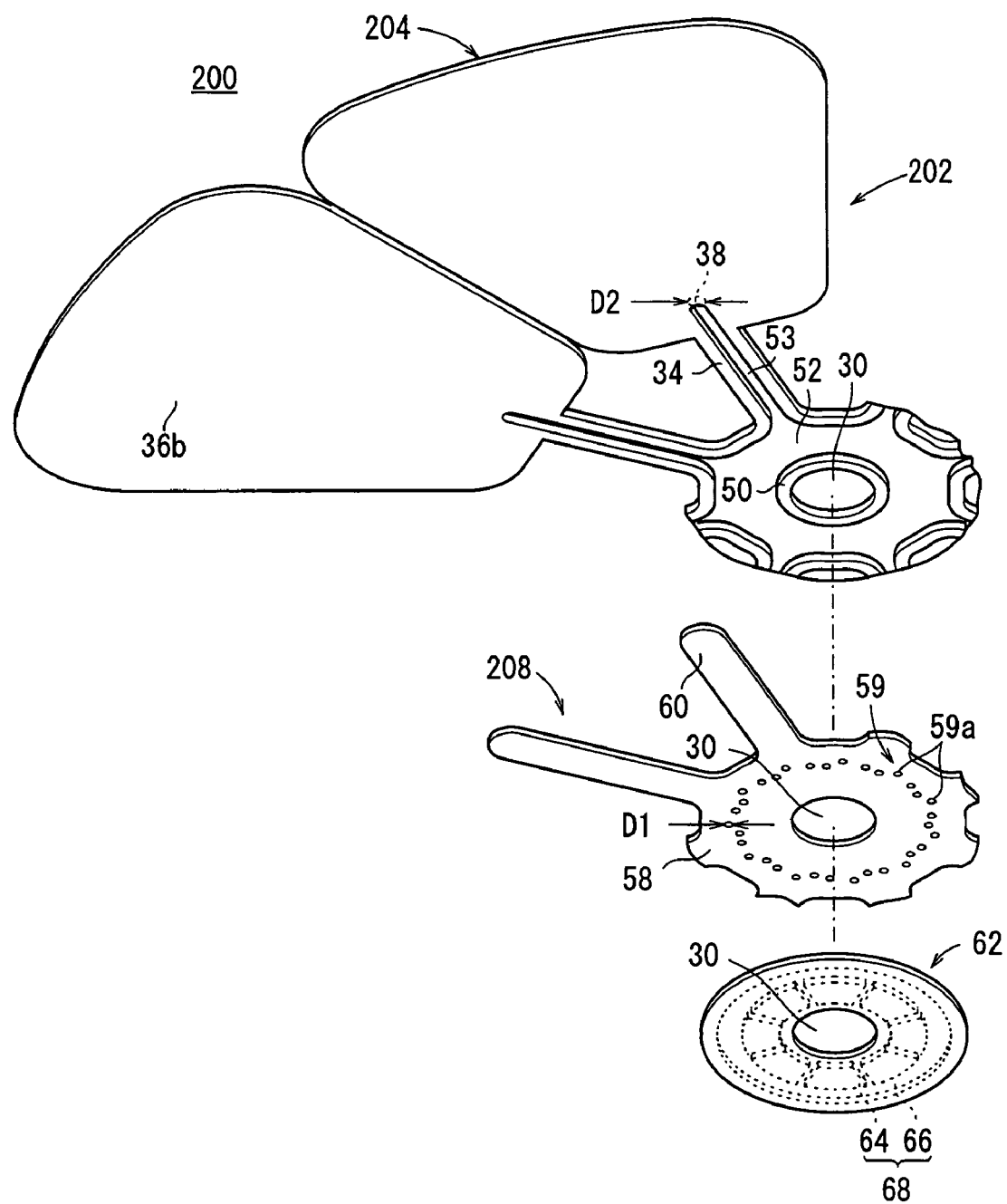
FIG. 17 is an exploded perspective view showing the separator, a channel lid member, and a circular disk member of the fuel cell.

As shown in FIG. 17, a protrusion 50, a recess 52, and grooves 53 are formed on the surface 36b of the separator 202 by, e.g., etching. Each of the grooves 53 is connected to a fuel gas inlet 38 formed at the inner edge portion of the trapezoidal section 204. A channel lid member 208 is fixed to the separator 202 to cover the recess 52, the grooves 53 and the fuel gas inlets 38. The channel lid member 208 has a planar shape. Further, the circular disk member 62 is fixed to the channel lid member 208.

As shown in FIG. 16, a deformable elastic channel member such as an electrically conductive mesh member 210 is provided on the surface 36b of each of the trapezoidal sections 204. The mesh member 210 has a substantially trapezoidal shape, and has a cutout 212 as a space for providing the second bridge 60 of the channel lid member 208. The mesh member 210 has a substantially trapezoidal shape. The size of the mesh member 210 is smaller than the size of the trapezoidal section 204.

Figure 18:
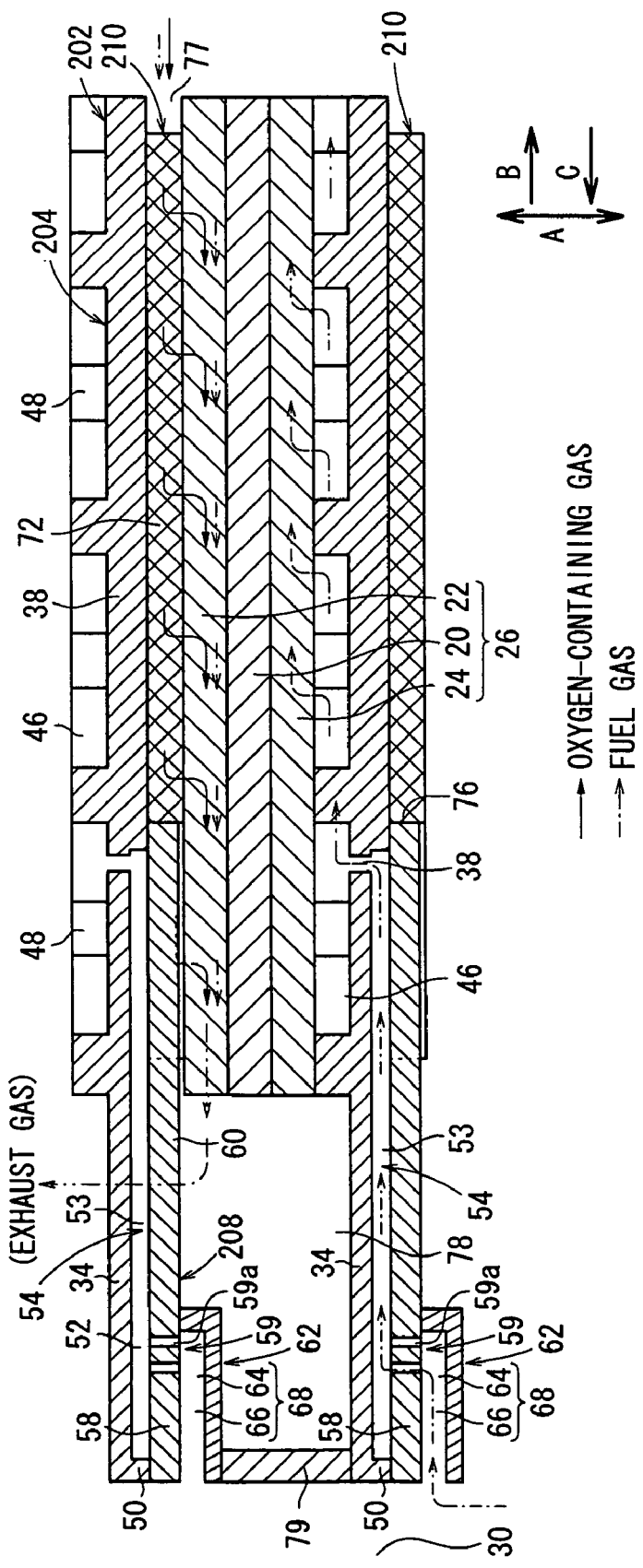
FIG. 18 is a cross sectional view schematically showing operation of the fuel cell.

In the fifth embodiment, the fuel gas from the fuel gas supply passage 30 flows through the holes 59a from the channel unit 68 of the circular disk member 62 of the fuel cell 200 into the fuel gas supply channel 54. As shown in FIG. 18, the fuel gas flows through the fuel gas supply channel 54. Then, the fuel gas flows through the fuel gas inlet 38 formed in the trapezoidal section 204, and is supplied to the fuel gas channel 46. Thus, the fuel gas flows outwardly in the direction indicated by the arrow B from the inner edge of the anode 24 toward the outer circumferential portion along the fuel gas channel 46.

The oxygen-containing gas supplied to the oxygen-containing gas supply unit 77 provided around the fuel cell 200 flows into the oxygen-containing gas channel 72 on the mesh member 210 from the space between the outer circumferential edge of the electrolyte electrode assembly 26a and the outer circumferential edge of the trapezoidal section 204 in the direction indicated by the arrow C. Thus, in the electrolyte electrode assembly 26a, electrochemical reactions are induced for power generation.

The fifth embodiment substantially adopts the structure of the third embodiment. However, the present invention is not limited in this respect. The fifth embodiment may adopt the structure of the fourth embodiment, or the structure of the first and second embodiments in which the oxygen-containing gas flows from the inside to the outside of the separators.

Figure 19:
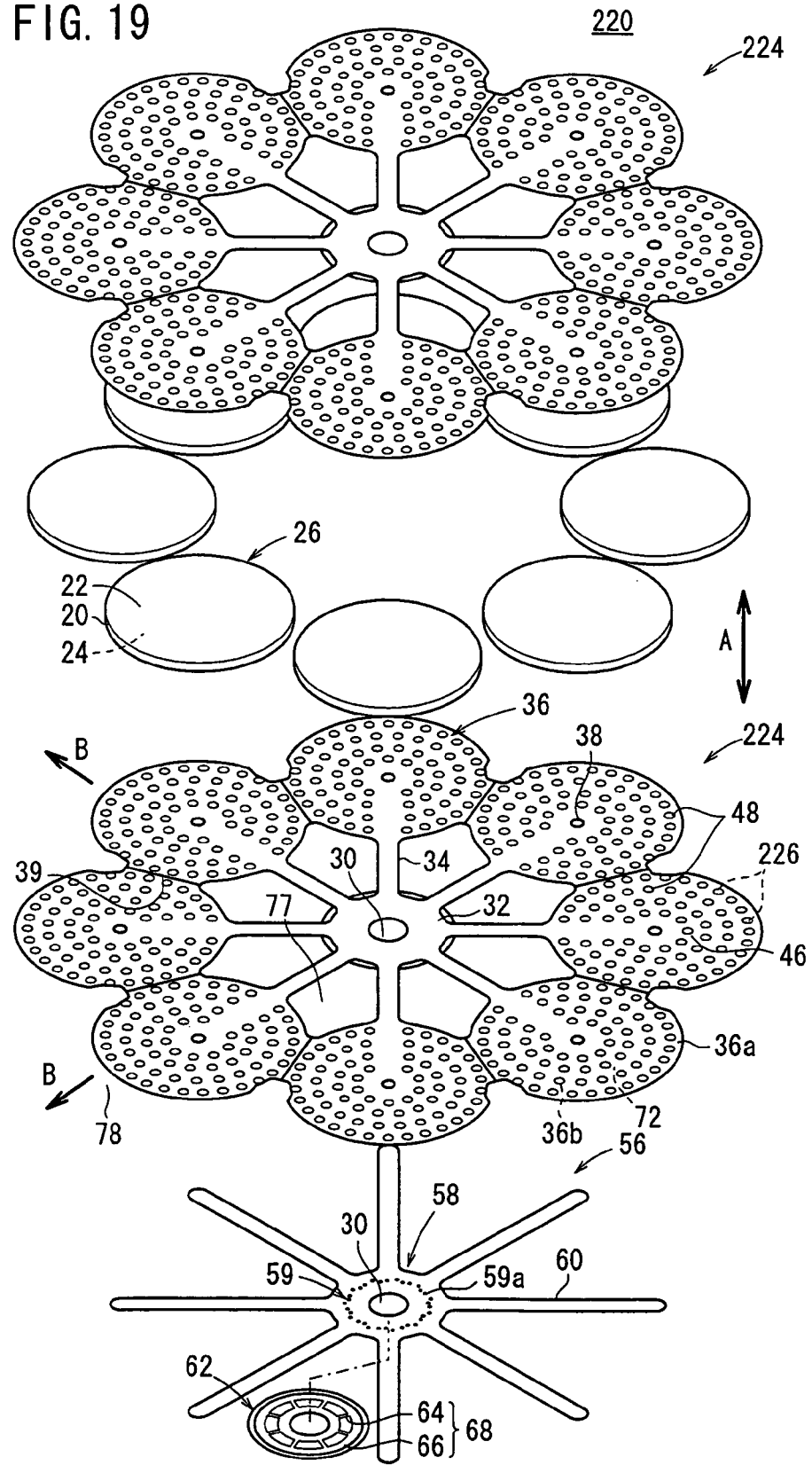
FIG. 19 is an exploded perspective view showing a fuel cell according to a sixth embodiment of the present invention.

FIG. 19 is an exploded perspective view showing a fuel cell 220 according to a sixth embodiment of the present invention. A plurality of the fuel cells 220 are stacked together to form a fuel cell stack.

Figure 20:
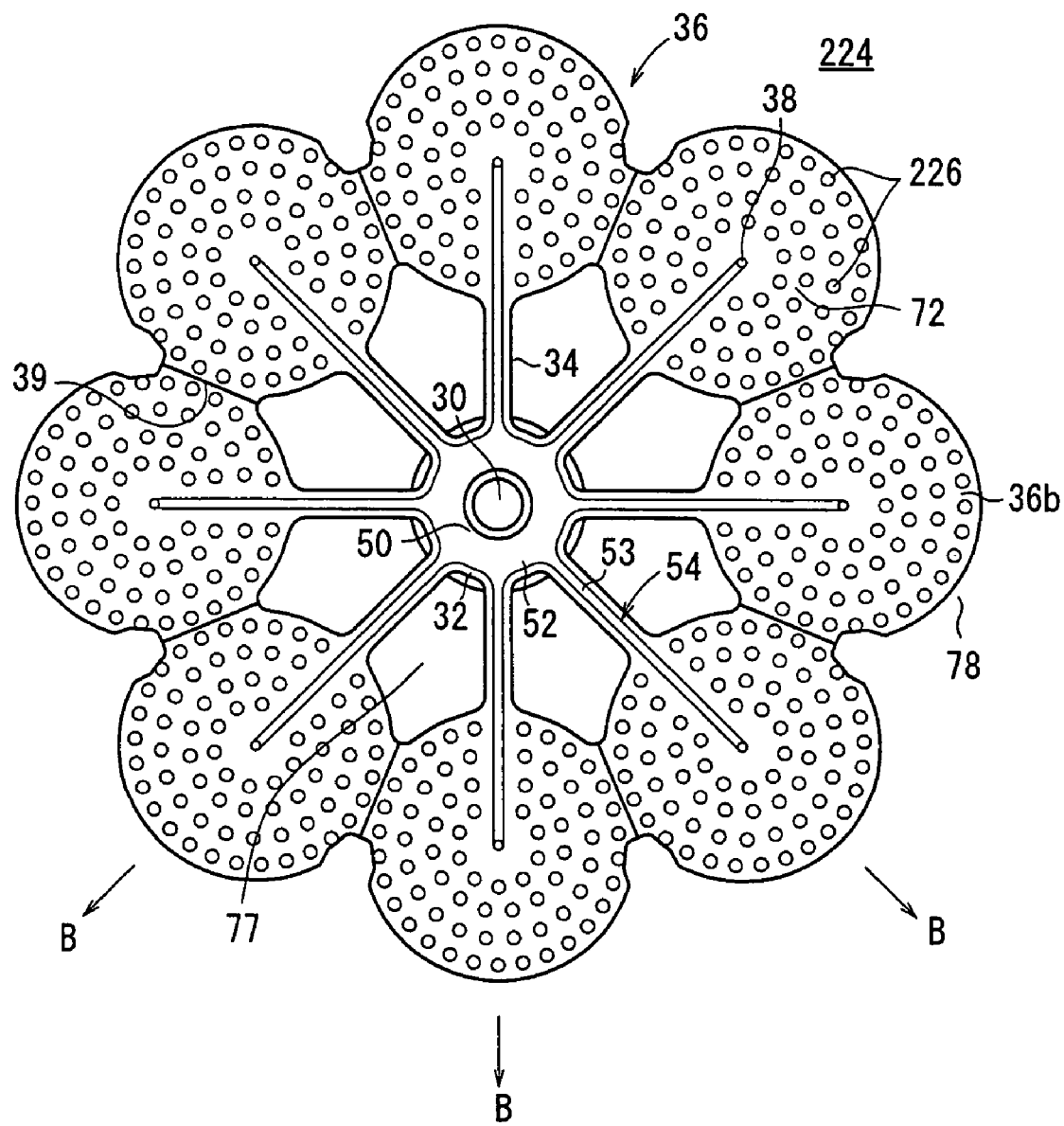
FIG. 20 is a front view showing a separator of the fuel cell.
Figure 21:
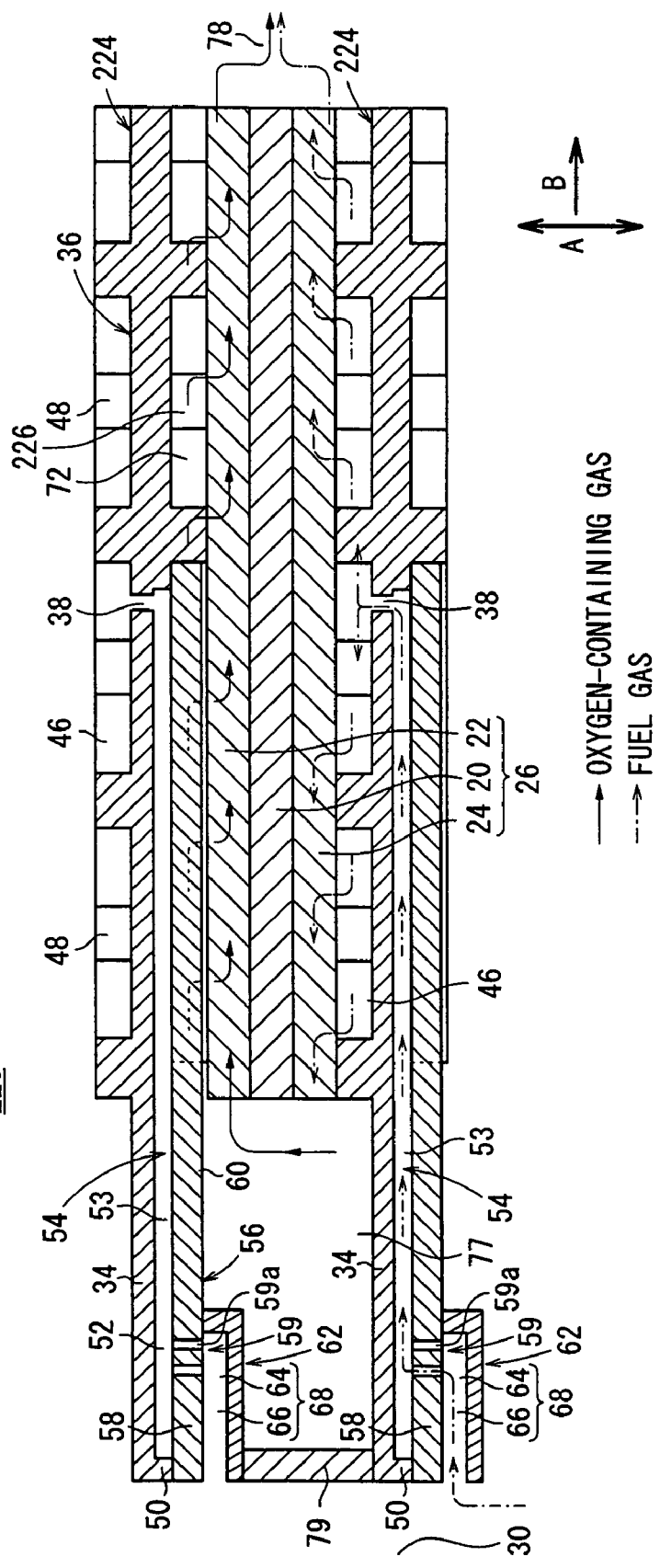
FIG. 21 is a cross sectional view schematically showing operation of the fuel cell.

As shown in FIG. 20, each of circular disks 36 of the separator 224 of a fuel cell 220 has protrusions 226 on its surface which contacts the cathode 22. The protrusions 226 form an oxygen-containing gas channel 72 for supplying the oxygen-containing gas along an electrode surface of the cathode 22. The protrusions 226 are similar to the protrusions 48 formed on the surface 36a. The protrusions 226 are solid portions formed on the surface 36b by, e.g., etching.

Figure 22:
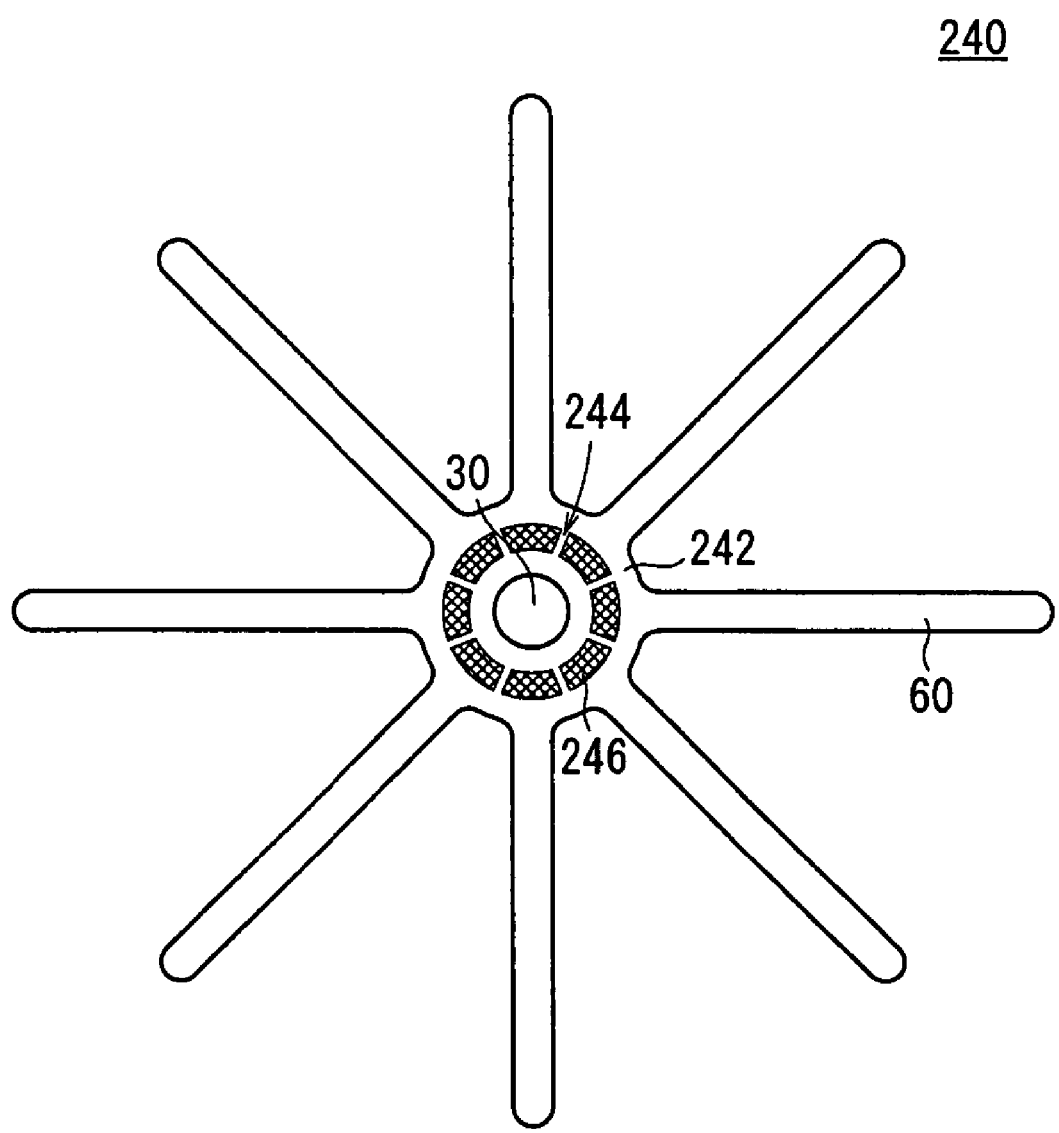
FIG. 22 is a front view showing a channel lid member of a fuel cell according to a seventh embodiment of the present invention.
Figure 23:
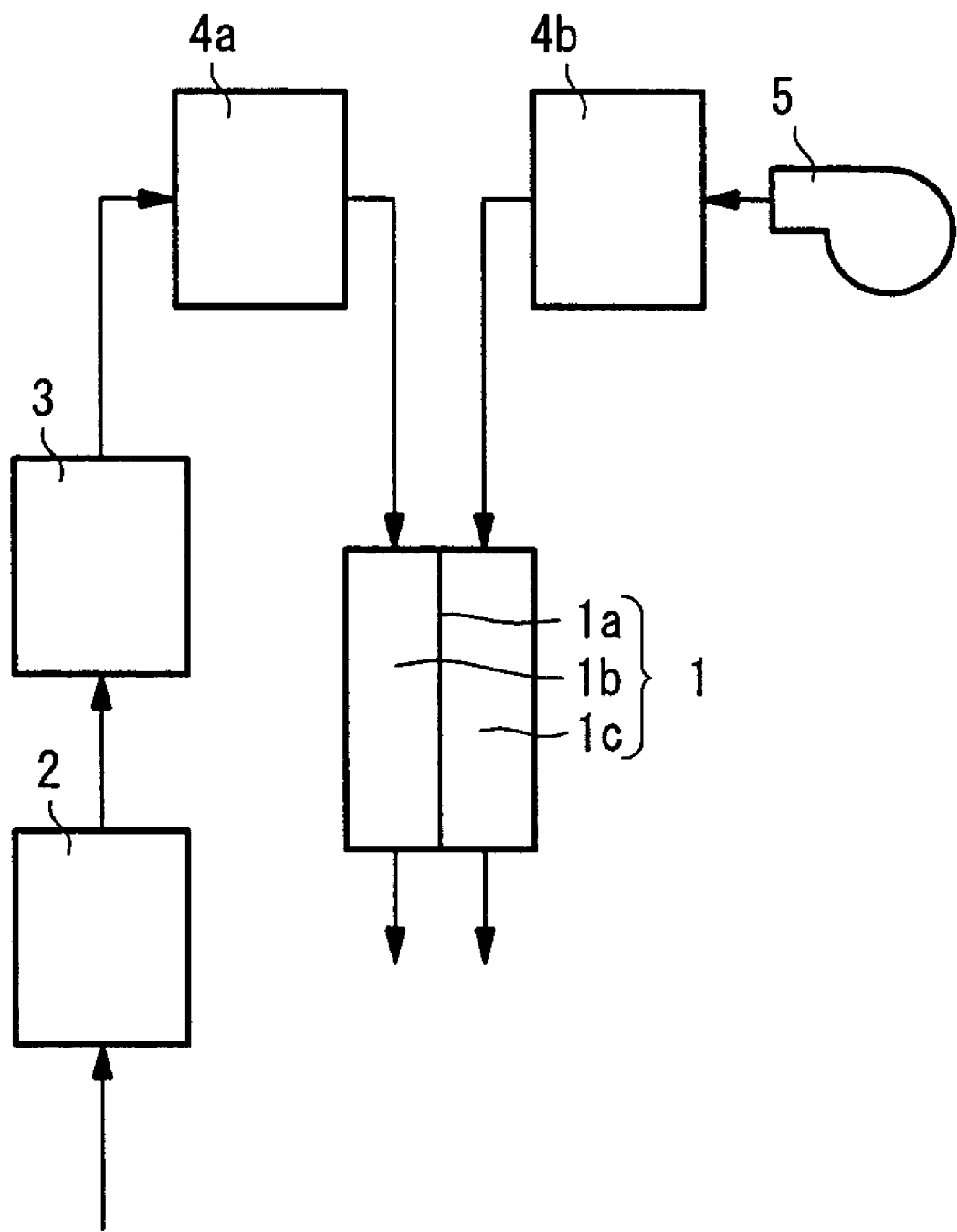
FIG. 23 is a view showing a conventional fuel cell.

The fuel cell 220 according to the sixth embodiment has the same structure as the fuel cell 11 according to the first embodiment, except that the protrusions 226 are used instead of the mesh member 74. In the fuel cell 220, the oxygen-containing gas, the fuel gas, and the exhaust gas flow as shown in FIG. 22. The sixth embodiment may be modified in the same manner as in the case of the second to fifth embodiments, except that the protrusions 226 are used.

FIG. 22 is a front view showing a channel lid member 240 of a fuel cell according to a seventh embodiment of the present invention.

The channel lid member 240 includes a second small diameter end portion 242, and a plurality of meshes 246 forming a filter mechanism 244 are provided at the second small diameter end portion 242. The cross sectional area of one opening of the mesh 246 is smaller than the cross sectional area of the opening of the fuel gas inlet (not shown), and the total cross sectional area of the openings of the meshes 246 is sufficiently larger than the cross sectional area of the openings of the fuel gas inlets.

In the seventh embodiment, the filter mechanism 244 includes the meshes 246 instead of the holes, and substantially the same advantages as in the case of the first to sixth embodiments can be obtained.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by alternately stacking a group of electrolyte electrode assemblies and a separator, each of the electrolyte electrode assemblies including an anode, a cathode, and an electrolyte interposed between said anode and said cathode, said separator consisting of a single plate having a plurality of sandwiching sections, each of the electrolyte electrode assemblies being sandwiched between one of the sandwiching sections of one separator and one of the sandwiching sections of an adjacent separator, said fuel cell comprising:

a fuel gas channel provided on one surface of said separator for supplying a fuel gas along an electrode surface of said anode;

an oxygen-containing gas channel provided on the other surface of said separator for supplying an oxygen-containing gas along an electrode surface of said cathode; a fuel gas supply channel provided on the one surface or on the other surface of said separator, and connected to a fuel gas supply unit and a fuel gas inlet for supplying the fuel gas into the fuel gas channel; and an exhaust gas channel for discharging the fuel gas and the oxygen-containing gas consumed in the reaction in said electrolyte electrode assembly as an exhaust gas in a stacking direction of said electrolyte electrode assembly and said separators, wherein said fuel gas supply channel includes a filter mechanism for filtering the fuel gas supplied from said fuel gas supply unit;

said filter mechanism is provided within the fuel cell stack and includes a hole for allowing the fuel gas to flow therethrough, and a cross sectional area of an opening of said hole is smaller than a cross sectional area of an opening of said fuel gas inlet;

said fuel gas supply unit for supplying the fuel gas before consumption in the stacking direction is provided hermetically inside said exhaust gas channel; and said fuel gas supply channel connects said fuel gas channel and said fuel gas supply unit, and is provided along the separator surface to intersect said exhaust gas channel extending in the stacking direction.

2. A fuel cell according to claim 1, wherein said fuel gas supply channel includes a groove formed on the one surface or on the other surface of said separator, and said fuel cell further comprises:

a channel lid member on the one surface or on the other surface of said separator to cover said groove, said hole being formed in said channel lid member; and a plate member provided at said channel lid member to cover said hole, and having a channel unit connecting said fuel gas supply unit and said hole.

3. A fuel cell according to claim 1, wherein protrusions forming said fuel gas channel are provided on one surface of said separator, and a deformable elastic channel unit forming said oxygen-containing gas channel and tightly contacting said cathode is provided on the other surface of said separator.

4. A fuel cell according to claim 3, wherein an area where said elastic channel unit is provided is smaller than a power generation area of said anode.

5. A fuel cell according to claim 3, wherein said elastic channel unit is made of an electrically conductive metal mesh member.

6. A fuel cell according to claim 3, wherein said protrusions are solid portions formed on one surface of said separator by etching.

7. A fuel cell according to claim 1, wherein said exhaust gas channel is provided at the central region of said separators.

8. A fuel cell according to claim 7, wherein said fuel gas supply unit is provided hermetically at the center of said exhaust gas channel.

9. A fuel cell according to claim 1, wherein said fuel gas inlet is provided at the center of said electrolyte electrode assembly or at an upstream position deviated from the center of said electrolyte electrode assembly in the flow direction of the oxygen-containing gas.

10. A fuel cell according to claim 1, further comprising an oxygen-containing gas supply unit for supplying the oxygen-containing gas before consumption to said oxygen-containing gas supply channel from the outer circumference of said electrolyte electrode assembly to said oxygen-containing gas channel.

11. A fuel cell according to claim 1, wherein said group of electrolyte electrode assemblies are arranged along a virtual circle concentric with the center of said separators.

12. A fuel cell formed by alternately stacking a group of electrolyte electrode assemblies and a separator, each of said electrolyte electrode assemblies including an anode, a cathode, and an electrolyte interposed between said anode and said cathode, said separator consisting of a single plate having a plurality of sandwiching sections, each of the electrolyte electrode assemblies being sandwiched between one of the sandwiching sections of one separator and one of the sandwiching sections of an adjacent separator, said fuel cell comprising:

a fuel gas channel provided on one surface of said separator for supplying a fuel gas along an electrode surface of said anode;

an oxygen-containing gas channel provided on the other surface of said separator for supplying an oxygen-containing gas along an electrode surface of said cathode;

a fuel gas supply channel provided on the one surface or on the other surface of said separator, and connected to a fuel gas supply unit and a fuel gas inlet for supplying the fuel gas into the fuel gas channel;

an exhaust gas channel for discharging the fuel gas and the oxygen-containing gas consumed in the reaction in said electrolyte electrode assembly as an exhaust gas in the stacking direction of said electrolyte electrode assembly and said separators;

an oxygen-containing gas supply unit for allowing the oxygen-containing gas before consumption to flow in the stacking direction to supply the oxygen-containing gas to said oxygen-containing gas channel, wherein said fuel gas supply unit for supplying the fuel gas before consumption in the stacking direction is provided hermetically inside said oxygen-containing gas supply unit; and said fuel gas supply channel connects said fuel gas channel and said fuel gas supply unit, and is provided along the separator surface to intersect said oxygen-containing gas supply unit extending in the stacking direction;

said fuel gas supply channel includes a filter mechanism for filtering the fuel gas supplied from said fuel gas supply unit; and said filter mechanism is provided within the fuel cell stack and includes a hole for allowing the fuel gas to flow therethrough, and a cross sectional area of an opening of said hole is smaller than a cross sectional area of an opening of said fuel gas inlet.

13. A fuel cell according to claim 12, wherein said exhaust gas channel is provided outside said separators.

14. A fuel cell according to claim 12, wherein said fuel gas supply unit is provided hermetically at the central region of said separators.

15. A fuel cell according to claim 12, wherein said fuel gas inlet is provided at the center of said electrolyte electrode assembly or at an upstream position deviated from the center of said electrolyte electrode assembly in the flow direction of the oxygen-containing gas.

16. A fuel cell according to claim 12, wherein said electrolyte electrode assembly comprises a plurality of electrolyte electrode assemblies, said fuel cell further comprising an oxygen-containing gas supply unit for supplying the oxygen-containing gas before consumption to said oxygen-containing gas channel from the inner circumference of said electrolyte electrode assemblies arranged along a virtual circle.

17. A fuel cell according to claim 12, wherein said fuel gas supply channel includes a groove formed on the one surface or the other surface of the separator, and said fuel cell further comprises:
a channel lid member on the one surface or the other surface of said separator to cover said groove, said hole being formed in said channel lid member; and
a plate member provide at said channel lid member to cover said hole, and having a channel unit connecting said fuel gas supply unit and said hole.

18. A fuel cell according to claim 12, wherein protrusions forming said fuel gas channel are provided on one surface of said separator, and a deformable elastic channel unit forming said oxygen-containing gas channel and tightly contacting said cathode is provided on the other surface of said separator.

19. A fuel cell according to claim 18, wherein an area where said elastic channel unit is provided is smaller than a power generation area of said anode.

20. A fuel cell according to claim 18, wherein said elastic channel unit is made of an electrically conductive metal mesh member.

21. A fuel cell according to claim 18, wherein said protrusions are solid portions formed on one surface of said separator by etching.

22. A fuel cell according to claim 12, wherein said group of electrolyte electrode assemblies are arranged along a virtual circle concentric with the center of said separators.

23. A fuel cell stack formed by stacking a plurality of fuel cells, said fuel cells each formed by alternately stacking a group of electrolyte electrode assemblies and a separator, each of said electrolyte electrode assemblies including an anode, a cathode, and an electrolyte interposed between said anode and said cathode, said separators each consisting of a single plate having a plurality of sandwiching sections, each of the electrolyte electrode assemblies being sandwiched between one of the sandwiching sections of one separator and one of the sandwiching sections of an adjacent separator, said fuel cell comprising:

a fuel gas channel provided on one surface of said separator for supplying a fuel gas along an electrode surface of said anode;

an oxygen-containing gas channel provided on the other surface of said separator for supplying an oxygen-containing gas along an electrode surface of said cathode;

a fuel gas supply channel provided on the one surface or on the other surface of said separator, and connected to a fuel gas supply unit and a fuel gas inlet for supplying the fuel gas into the fuel gas channel;

an exhaust gas channel for discharging the fuel gas and the oxygen-containing gas consumed in the reaction in said electrolyte electrode assembly as an exhaust gas in a stacking direction of said electrolyte electrode assembly and said separators, wherein the fuel gas supply channel includes a filter mechanism for filtering the fuel gas supplied from the fuel gas supply unit;

said filter mechanism is provided within the fuel cell stack and includes a hole for allowing the fuel gas to flow therethrough, and a cross sectional area of an opening of said hole is smaller than a cross sectional area of an opening of said fuel gas inlet;

said fuel gas supply unit for supplying the fuel gas before consumption in the stacking direction is provided hermetically inside said exhaust gas channel; and said fuel gas supply channel connects said fuel gas channel and said fuel gas supply unit, and is provided along the separator surface to intersect said exhaust gas channel extending in the stacking direction.

24. A fuel cell according to claim 23, wherein said fuel gas supply channel includes a groove formed on the one surface or on the other surface of said separator;

a channel lid member on the one surface or on the other surface of said separator to cover said groove, said hole being formed in said channel lid member; and a plate member provided at said channel lid member to cover said hole, and having a channel unit connecting said fuel gas supply unit and said hole.

25. A fuel cell stack formed by stacking a plurality of fuel cells, said fuel cells each formed by alternately stacking a group of electrolyte electrode assemblies and a separator, each of said electrolyte electrode assemblies including an anode, a cathode, and an electrolyte interposed between said anode and said cathode, said separators each consisting of a single plate having a plurality of sandwiching sections, each of the electrolyte electrode assemblies being sandwiched between one of the sandwiching sections of one separator and one of the sandwiching sections of an adjacent separator, said fuel cell comprising:

a fuel gas channel provided on one surface of said separator for supplying a fuel gas along an electrode surface of said anode;

an oxygen-containing gas channel provided on the other surface of said separator for supplying an oxygen-containing gas along an electrode surface of said cathode;

a fuel gas supply channel provided on the one surface or on the other surface of said separator, and connected to a fuel gas supply unit and a fuel gas inlet for supplying the fuel gas into the fuel gas channel;

an exhaust gas channel for discharging the fuel gas and the oxygen-containing gas consumed in the reaction in said electrolyte electrode assembly as an exhaust gas in a stacking direction of said electrolyte electrode assembly and said separators, wherein an oxygen-containing gas supply unit for allowing the oxygen-containing gas before consumption to flow in the stacking direction to supply the oxygen-containing gas to said oxygen-containing gas channel, wherein said fuel gas supply unit for supplying the fuel gas before consumption in the stacking direction is provided hermetically inside said oxygen-containing gas supply unit;

said fuel gas supply channel connects said fuel gas supply channel and said fuel gas supply unit, and is provided along the separator surface to intersect said oxygen-containing gas supply unit extending in the stacking direction;

said fuel gas supply channel includes a filter mechanism for filtering the fuel gas supplied from said fuel gas supply unit; and said filter mechanism is provided within the fuel cell stack and includes a hole for allowing the fuel gas to flow therethrough, and a cross sectional area of an opening of said hole is smaller than a cross sectional area of an opening of said fuel gas inlet.

26. A fuel cell according to claim 25, wherein said fuel gas supply channel includes a groove formed on the one surface or on the other surface of said separator;

a channel lid member on the one surface or on the other surface of said separator to cover said groove, said hole being formed in said channel lid member; and a plate member provided at a separate channel lid member to cover said hole, and having a channel unit connecting said fuel gas supply unit and said hole.

* * * * *